US012626695B1

(12) United States Patent
Balasubramaniam et al.

(10) Patent No.: US 12,626,695 B1
(45) Date of Patent: May 12, 2026

(54) CACHE TECHNIQUES FOR LARGE LANGUAGE MODEL PROCESSING

(71) Applicant: Amazon Technologies, Inc., Seattle, WA (US)

(72) Inventors: Kartik Balasubramaniam, Framingham, MA (US); Venkata Siva Sai Krishna Balakavi, Jersey City, NJ (US); Austin Doolittle, Roslindale, MA (US)

(73) Assignee: Amazon Technologies, Inc., Seattle, WA (US)

( * ) Notice: Subject to any disclaimer, the term of this patent is extended or adjusted under 35 U.S.C. 154(b) by 198 days.

(21) Appl. No.: 18/469,849

(22) Filed: Sep. 19, 2023

(51) Int. Cl.
    *G10L 15/197* (2013.01)
    *G10L 15/16* (2006.01)
    *G10L 15/18* (2013.01)
    *G10L 15/183* (2013.01)
    *G10L 15/22* (2006.01)
    *G10L 15/28* (2013.01)

(52) U.S. Cl.
    CPC ........ *G10L 15/197* (2013.01); *G10L 15/1815* (2013.01); *G10L 15/183* (2013.01); *G10L 15/22* (2013.01); *G10L 15/285* (2013.01); *G10L 15/16* (2013.01); *G10L 2015/228* (2013.01)

(58) Field of Classification Search
    CPC ....... G10L 15/16; G10L 15/18; G10L 15/183; G10L 15/1815; G10L 15/197; G10L 15/22; G10L 15/285; G10L 2015/085; G10L 2015/228

USPC .................................................. 704/232, 275
See application file for complete search history.

(56) References Cited

U.S. PATENT DOCUMENTS

| | | | |
|---|---|---|---|
| 11,797,769 B1* | 10/2023 | Gangadharaiah .... | G06N 3/0442 |
| 11,934,792 B1* | 3/2024 | Adato ..................... | G06F 40/30 |
| 2022/0309348 A1* | 9/2022 | Guo ........................... | G06N 3/08 |
| 2023/0056680 A1* | 2/2023 | Thomas ............... | G10L 15/065 |
| 2023/0082605 A1* | 3/2023 | Chen ................... | G06F 16/3347 |
| | | | 704/9 |
| 2023/0360651 A1* | 11/2023 | Choi ....................... | G06F 40/35 |
| 2023/0401243 A1* | 12/2023 | Sun .......................... | G06N 3/08 |
| 2024/0062014 A1* | 2/2024 | Sreedhar ................ | G06F 40/35 |

(Continued)

OTHER PUBLICATIONS

Santra, Bishal, et al. "Frugal prompting for dialog models." arXiv preprint arXiv:2305.14919, May 2023, pp. 1-22. (Year: 2023).*

(Continued)

*Primary Examiner* — James S Wozniak
(74) *Attorney, Agent, or Firm* — Pierce Atwood LLP

(57) ABSTRACT

Techniques for cache management for reducing latency in LLM inferencing are described. In some embodiments, a system caches encoded data of portions of a prompt so that the encoded data is available for use by the LLM across dialog turns of a dialog session. Within a dialog session, a portion of the LLM prompt may be the same across dialog turns, and instead of recomputing the attention/encodings for such portions, the cached encodings can be used by the LLM during processing. In some embodiments, user inputs for the dialog session may be routed to the same LLM container and encoded data for the dialog session may be stored at the same cache associated with the LLM. In some embodiments, the system enables asynchronous prompt encoding while performing ASR processing.

20 Claims, 18 Drawing Sheets

(56) References Cited

U.S. PATENT DOCUMENTS

| | | | | |
|---|---|---|---|---|
| 2024/0282294 A1* | 8/2024 | Huang | ................. | G10H 1/0025 |
| 2025/0022200 A1* | 1/2025 | Huang | ................. | G10L 13/047 |
| 2025/0061283 A1* | 2/2025 | Lee | ......................... | G06F 40/30 |
| 2025/0069617 A1* | 2/2025 | Carbune | ............... | G10L 15/183 |
| 2025/0118297 A1* | 4/2025 | Pho | .................... | H04M 3/4936 |

OTHER PUBLICATIONS

Wu, Bingyang, et al. "Fast distributed inference serving for large language models." arXiv preprint arXiv:2305.05920, May 2023, pp. 1-14. (Year: 2023).*
Xiao, Yao. "Optimizing the Serving System for Large Language Model Inference." Fall 2022, pp. 1-26. (Year: 2022).*

* cited by examiner

FIG. 1

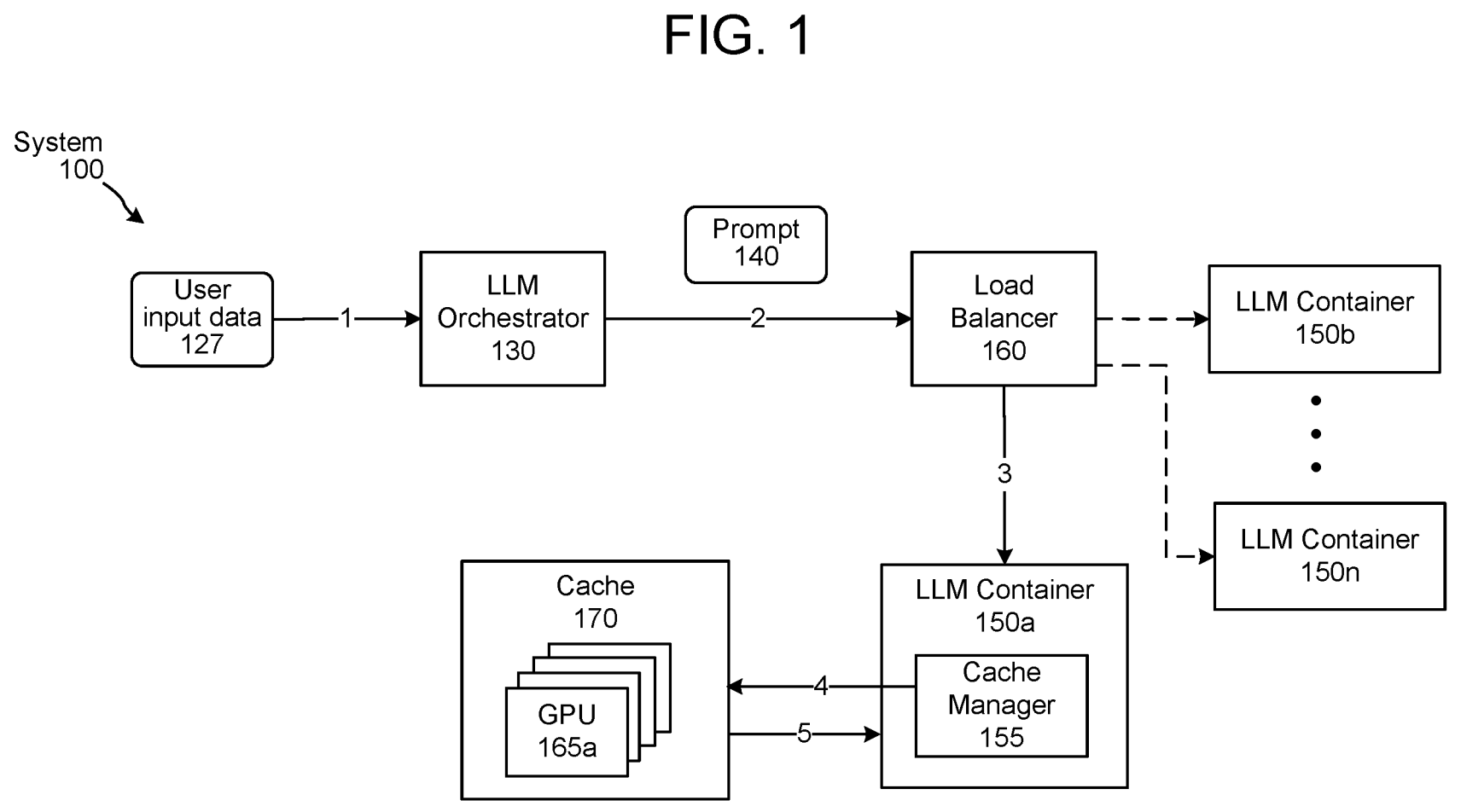

System 100

User input data 127

LLM Orchestrator 130

Prompt 140

Load Balancer 160

LLM Container 150b

• • • •

LLM Container 150n

LLM Container 150a

Cache Manager 155

Cache 170

GPU 165a

Figure 2:
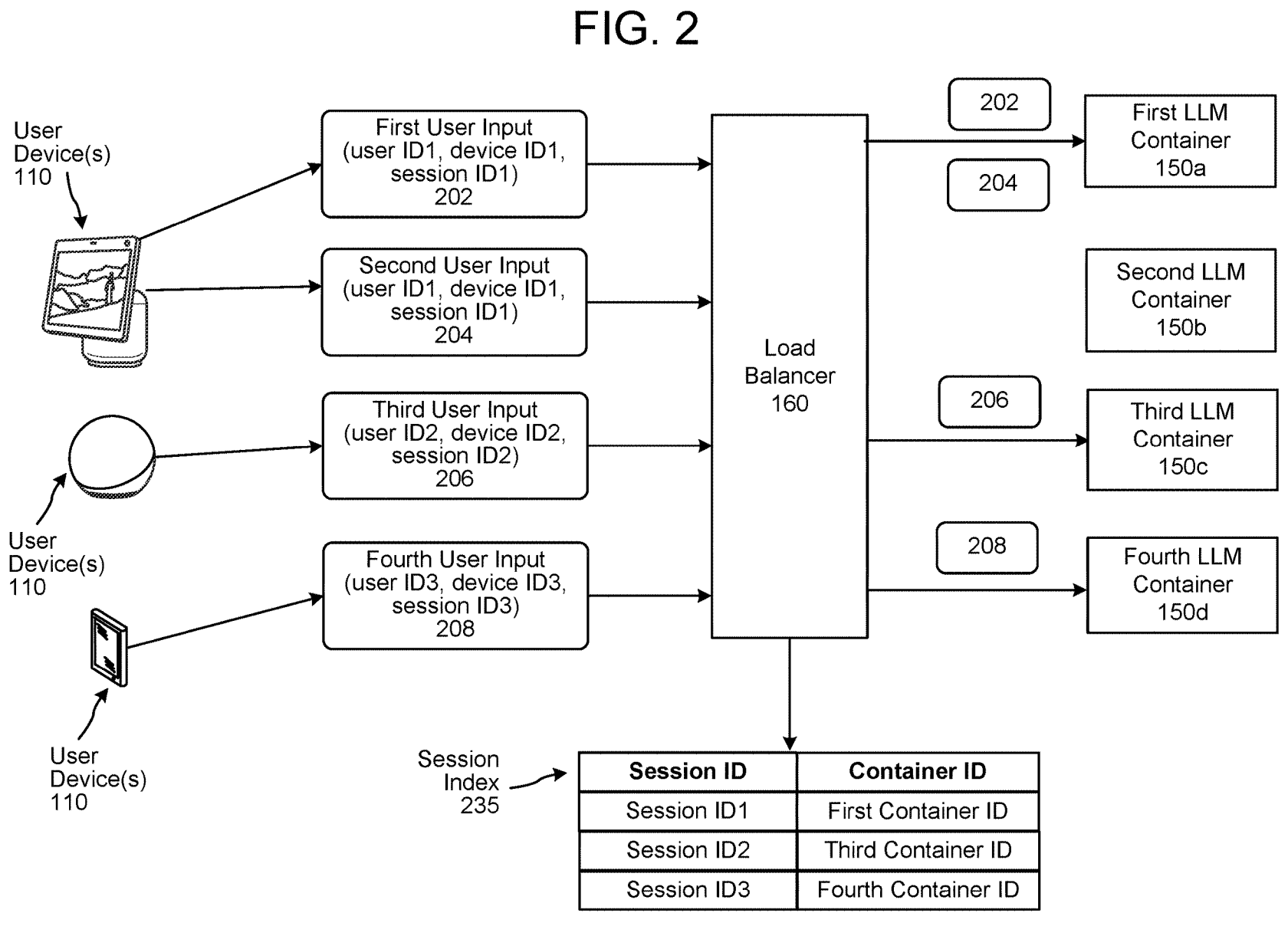

First LLM Container 150a

Second LLM Container 150b

Third LLM Container 150c

Fourth LLM Container 150d

202

204

206

208

Load Balancer 160

| Session ID | Container ID |
|---|---|
| Session ID | Container ID |
| Session ID1 | First Container ID |
| Session ID2 | Third Container ID |
| Session ID3 | Fourth Container ID |

Session Index 235

First User Input (user ID1, device ID1, session ID1) 202

Second User Input (user ID1, device ID1, session ID1) 204

Third User Input (user ID2, device ID2, session ID2) 206

Fourth User Input (user ID3, device ID3, session ID3) 208

User Device(s) 110

User Device(s) 110

User Device(s) 110

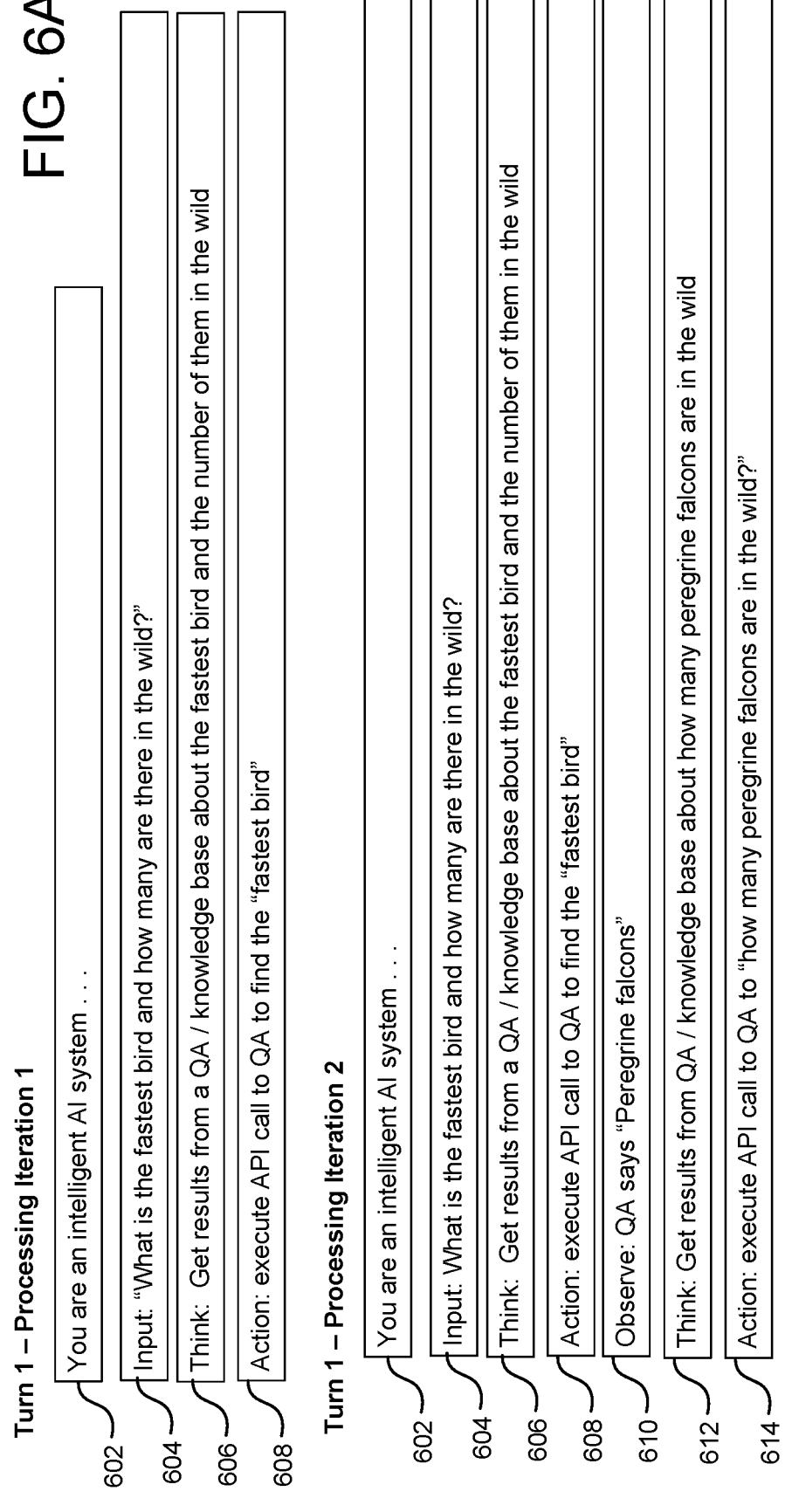

FIG. 6A

Turn 1 – Processing Iteration 1

602 — You are an intelligent AI system . . . .

604 — Input: "What is the fastest bird and how many are there in the wild?"

606 — Think:  Get results from a QA / knowledge base about the fastest bird and the number of them in the wild 608 — Action: execute API call to QA to find the "fastest bird"

Turn 1 – Processing Iteration 2

602 — You are an intelligent AI system . . . .

604 — Input: What is the fastest bird and how many are there in the wild?

606 — Think:  Get results from a QA / knowledge base about the fastest bird and the number of them in the wild 608 — Action: execute API call to QA to find the "fastest bird"

610 — Observe: QA says "Peregrine falcons"

612 — Think: Get results from QA / knowledge base about how many peregrine falcons are in the wild 614 — Action: execute API call to QA to "how many peregrine falcons are in the wild?"

FIG. 6B

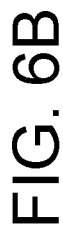

Turn 1 – Processing Iteration 3 – End of Turn 1

602 — You are an intelligent AI system . . . .

604 — Input: What is the fastest bird and how many are there in the wild?

606 — Think: Get results from a QA / knowledge base about the fastest bird and the number of them in the wild 608 — Action: execute API call to QA to find the "fastest bird"

610 — Observe: QA says "Peregrine falcons"

612 — Think: Get results from QA / knowledge base about how many peregrine falcons are in the wild 614 — Action: execute API call to QA to "how many peregrine falcons are in the wild?"

616 — Observe: QA says there are 340,000 peregrine falcons in the wild

618 — Response: The fastest bird is the peregrine falcon, and there are 340,000 of them in the wild.

Turn 2 – Processing Iteration 1

602 — You are an intelligent AI system . . . .

604 — Input: What is the fastest bird and how many are there in the wild?

618 — Response: The fastest bird is the peregrine falcon, and there are 340,000 of them in the wild.

620 — Input: What do they eat?

FIG. 6C

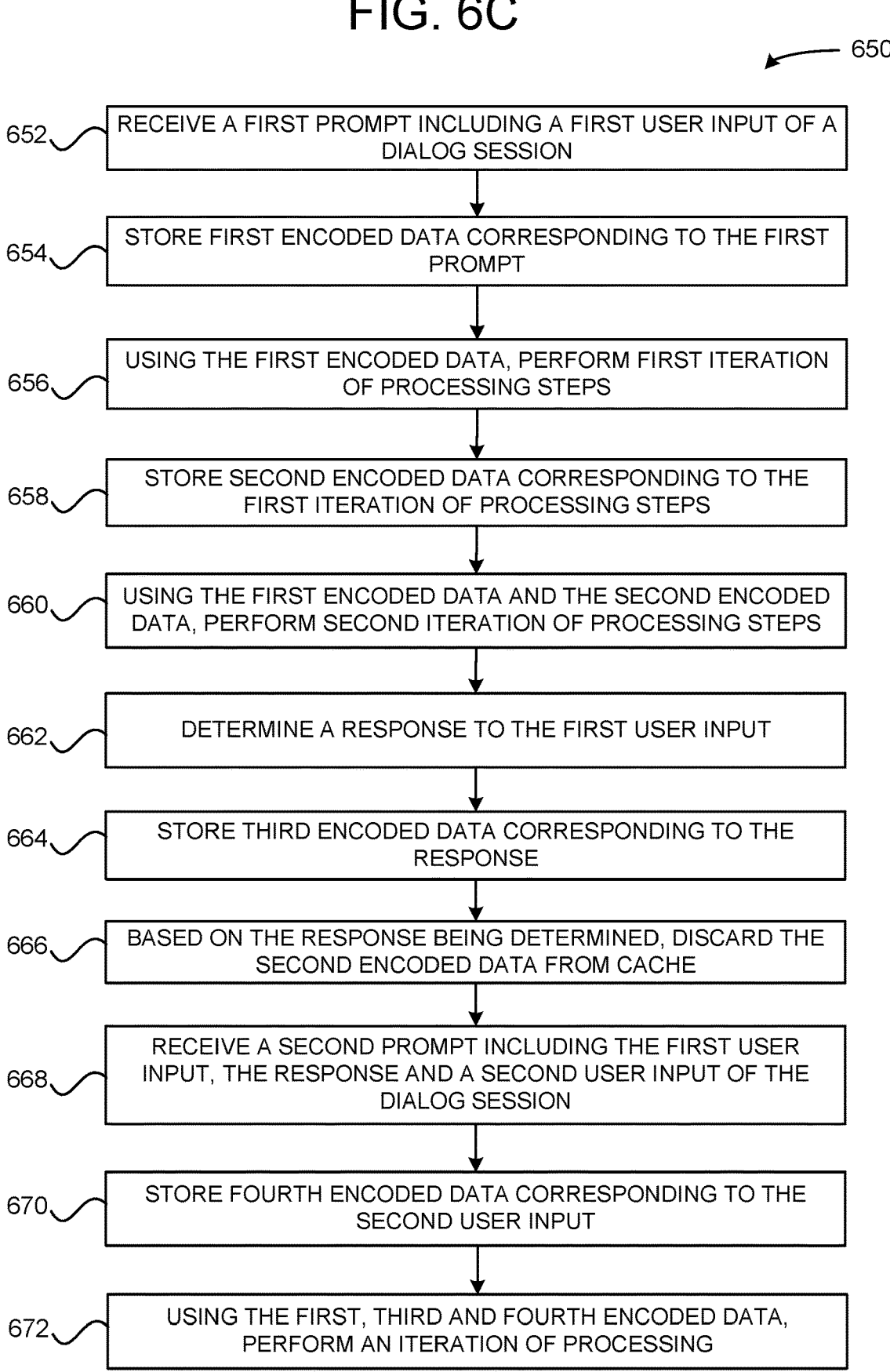

650

652   RECEIVE A FIRST PROMPT INCLUDING A FIRST USER INPUT OF A DIALOG SESSION

654   STORE FIRST ENCODED DATA CORRESPONDING TO THE FIRST PROMPT

656   USING THE FIRST ENCODED DATA, PERFORM FIRST ITERATION OF PROCESSING STEPS

658   STORE SECOND ENCODED DATA CORRESPONDING TO THE FIRST ITERATION OF PROCESSING STEPS

660   USING THE FIRST ENCODED DATA AND THE SECOND ENCODED DATA, PERFORM SECOND ITERATION OF PROCESSING STEPS

662   DETERMINE A RESPONSE TO THE FIRST USER INPUT

664   STORE THIRD ENCODED DATA CORRESPONDING TO THE RESPONSE

666   BASED ON THE RESPONSE BEING DETERMINED, DISCARD THE SECOND ENCODED DATA FROM CACHE

668   RECEIVE A SECOND PROMPT INCLUDING THE FIRST USER INPUT, THE RESPONSE AND A SECOND USER INPUT OF THE DIALOG SESSION

670   STORE FOURTH ENCODED DATA CORRESPONDING TO THE SECOND USER INPUT

672   USING THE FIRST, THIRD AND FOURTH ENCODED DATA, PERFORM AN ITERATION OF PROCESSING

FIG. 10

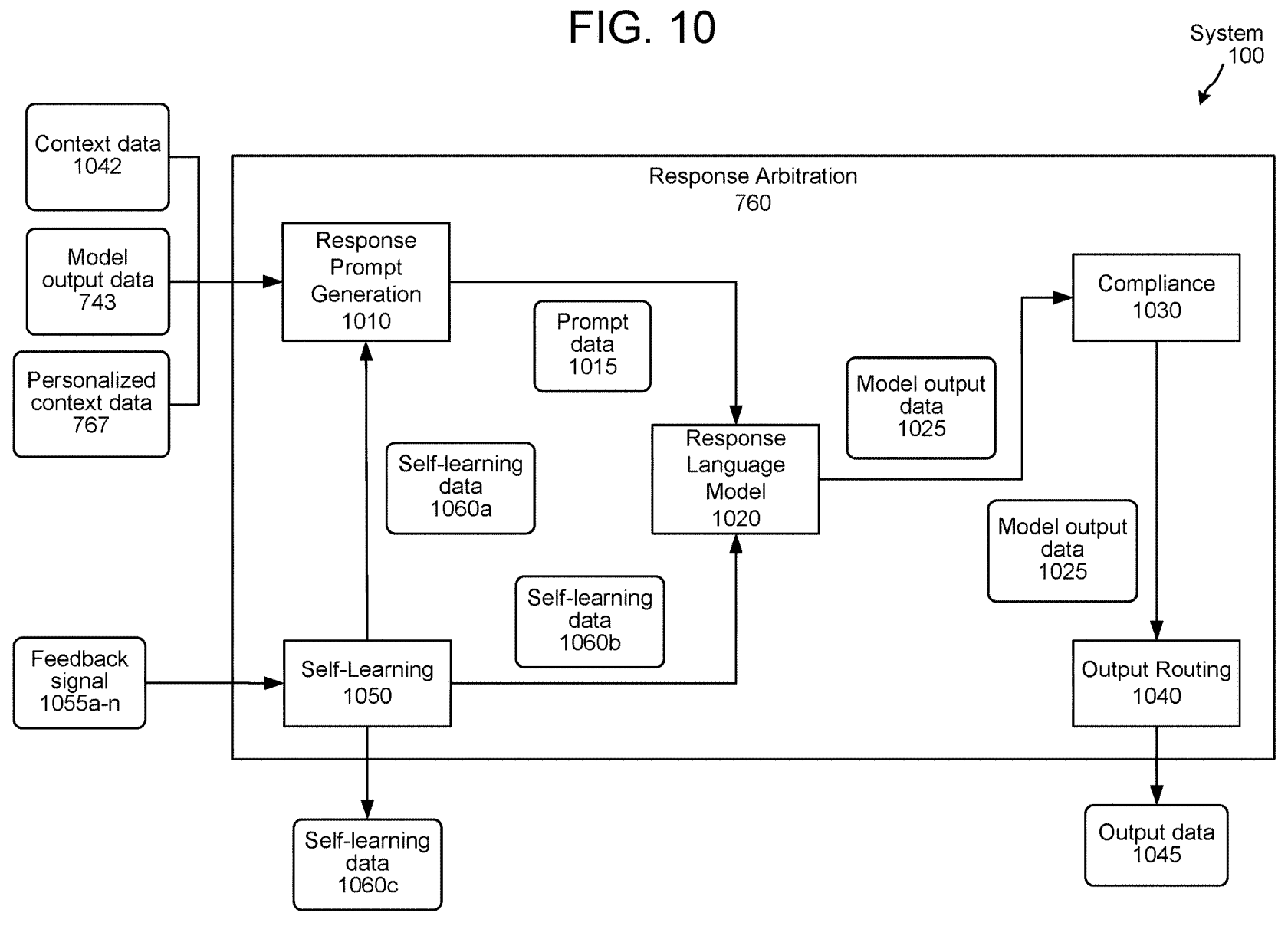

System 100

Response Arbitration 760

Compliance 1030

Model output data 1025

Output Routing 1040

Output data 1045

Model output data 1025

Response Language Model 1020

Prompt data 1015

Self-learning data 1060b

Self-learning data 1060a

Response Prompt Generation 1010

Self-Learning 1050

Self-learning data 1060c

Context data 1042

Model output data 743

Personalized context data 767

Feedback signal 1055a-n

FIG. 14

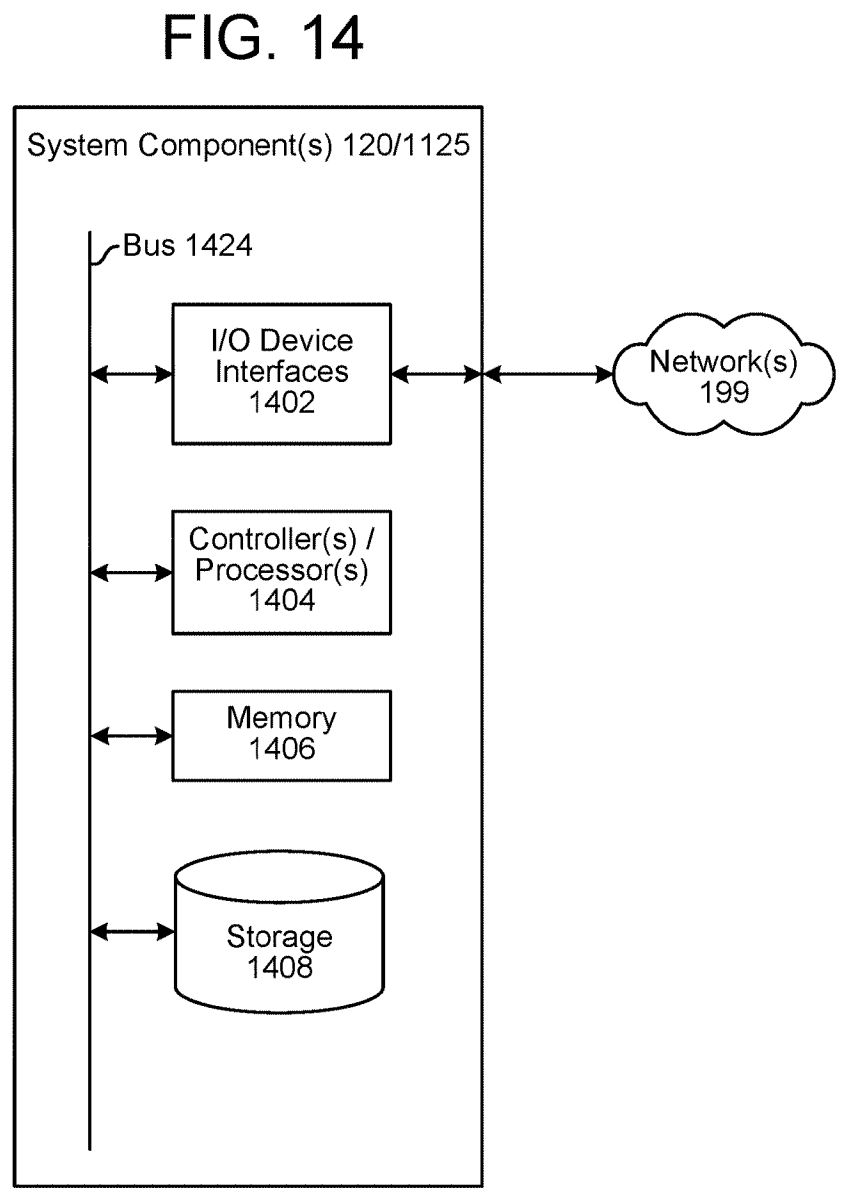

System Component(s) 120/1125

Network(s)
199

Bus 1424

I/O Device
Interfaces
1402

Controller(s) /
Processor(s)
1404

Memory
1406

Storage
1408

CACHE TECHNIQUES FOR LARGE LANGUAGE MODEL PROCESSING

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1 is a conceptual diagram illustrating an example system for cache management for large language model inference, according to embodiments of the present disclosure.

FIG. 2 is a conceptual diagram illustrating an example configuration of a system involving use of multiple LLM containers, according to embodiments of the present disclosure.

FIGS. 6A-6B show example user inputs and corresponding model processing data that may be stored in a cache, according to embodiments of the present disclosure.

FIG. 6C is a flowchart illustrating an example process that may be performed to store data in a cache and discard data from the cache, according to embodiments of the present disclosure.

FIG. 10 is a conceptual diagram illustrating example component and processing of a response arbitration component, according to embodiments of the present disclosure.

FIG. 14 is a block diagram conceptually illustrating example components of a system according to embodiments of the present disclosure.

DETAILED DESCRIPTION

Figure 3:
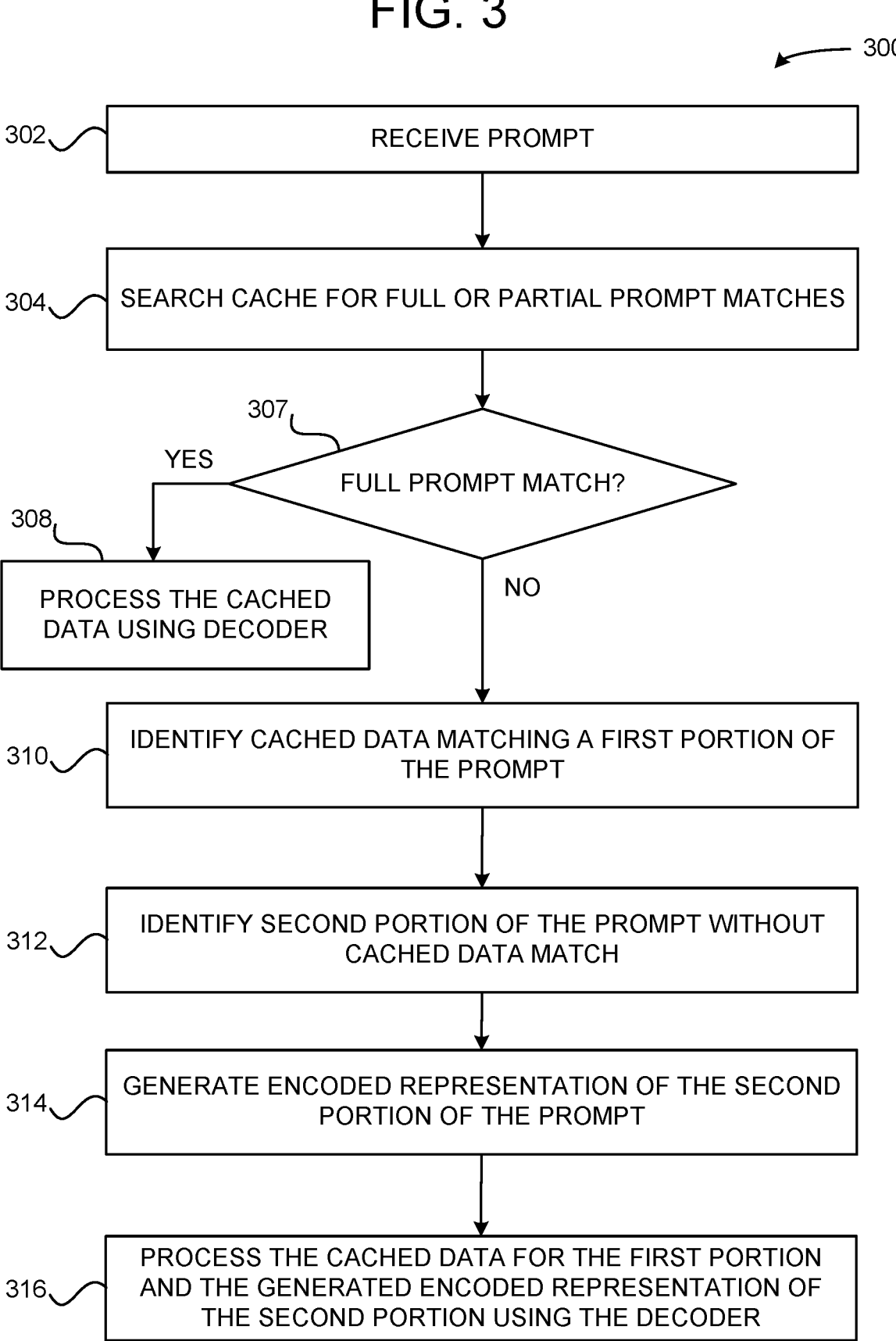
FIG. 3 is a flowchart illustrating an example process for using cache data that matches a portion of a prompt, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

Language modeling (LM) is the use of various statistical and probabilistic techniques to determine the probability of a given sequence of words occurring in a sentence. LM can be used to perform various tasks including generative tasks that involve generating data rather than discriminating between given classes. Language models analyze bodies of text data to provide a basis for their word predictions. The language models are generative models. In some embodiments, the language models may be a large language model (LLM). An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some embodiments, the system may be configured to process the ASR data (or other type of data representing another type of user input) using one or more language models (e.g., one or more large language models (LLMs)) to determine the action responsive to the user input. For example, in response to the user input "Please plan a 4-person trip to [Location] from [Date 1] to [Date 2]," the system may determine that the user wants to book a trip to [Location] during the specified dates. Thereafter, the system may use the language model(s) to generate one or more tasks associated with booking the trip (e.g., (1) find a flight ticket from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.) configured to perform action(s) associated with a task.

The language model(s) may generate an output indicating one or more application programming interface (API) calls requesting that the one or more components return a description of the action(s) they are configured to/will perform with respect to the user input and/or current task. As used herein, an "API call" is an instruction/request for the corresponding API to perform a particular action (e.g., an API call of turn_on_device (device="indoor light 1") corresponds to an instruction/request to an API to turn on a device associated with the identifier "indoor light 1"). The system may execute the API calls and the language model(s) may determine that a first component (e.g., a travel booking website) of the one or more components is configured to perform an action responsive to the user input/task. The system may then perform as discussed herein above with respect to a next task (e.g., find a hotel in [Location] between [Date 1] and [Date 2]) of the one or more tasks. Thereafter, the language model(s) may determine that one or more components have been selected to perform the action(s) responsive to the user input, generate a response informing the user of the actions to be performed, and, with authorization, cause the one or more components to perform the action(s).

In some cases, a system may experience latency in responding to a user input when using an LLM because the models can be quite large. In some embodiments, LLMs use a transformer architecture, within which, the deep neural network performs many different types of operations, some which may be computationally expensive and time intensive. One such operation is called attention. For example, for a sentence "that cat is on the mat," there may be a relationship between "cat" and "mat", which the model may learn using the attention mechanism.

One way to reduce latency is "attention caching." The model generates tokens and it relies on the attention computation that has been previously done for the other tokens appearing before the current tokens. This type of attention is called left to right causal attention. That is, the tokens on the "left" do not impact the representation or the attention of the tokens on the "right." When processing an input, for each token that is already processed the model relies on the cached attention in processing a current token.

The present disclosure describes techniques for attention caching in a stateful manner that considers a user interacting with a system for multiple dialog turns, and the system preserves (caches) the state of prior dialog turns to process a current dialog turn. An input of a LLM is called a prompt and some information included in the prompt may be the same across dialog turns of a dialog session. For example, opening sentences, certain contextual information (e.g., device context, user context, situational context, etc.), in-context learning exemplars, etc. may be the same in a first prompt (for processing a first user input of a first dialog turn) and a second prompt (for processing a second user input of a second dialog turn). In processing a prompt including a user input, a LLM may first encode the prompt and then decode the encoded prompt to generate a response to the input. The system of the present disclosure stores the encoded representations of portions of a prompt that may be the same for multiple dialog turns of the dialog session, so that when processing a prompt for a subsequent dialog turn, the LLM can retrieve the stored encoded representations for that portion of the prompt rather than encoding that portion again.

Some embodiments involve determining query, key and value representations for prompt tokens and caching the key and value representations (KV). KV representations may be large and thus a cache may become large, unmanageable and not storable on a single machine. Embodiments of the present disclosure involve storing data on multiple different GPUs, where data corresponding to the same dialog session may be stored at the same GPU.

Certain cached data may be removed/deleted from the cache based on an end of a dialog turn and an end of a dialog session. A LLM may perform multiple iterations for processing a single prompt for a user input of a dialog turn. Certain LLM processing data for one iteration may be cached so that the LLM may be use it for the next iteration. In some cases, such LLM processing data may be deleted from the cache when the dialog turn has ended (i.e., the system has presented a response to the user input). While other data (e.g., portions of the prompt) may remain stored in the cache for use by the LLM when processing the next dialog turn.

In some embodiments, the system may be configured to asynchronously encode a prompt (or portion of the prompt) while performing ASR processing on spoken inputs. In some cases, portions of the prompt (e.g., beginning of the prompt) may be determined before a transcription of an utterance is available. For example, the beginning of the prompt may include beginning sentences and contextual information related to the user, the device, situation, etc. While the system is performing ASR processing for the utterance, the LLM may begin determining encoded representations for the beginning portion of the prompt. Determining the encoded representations may involve checking the cache for already computed encodings and/or generating new encodings. The system may identify portions of cached encoded data that may match a portion of the prompt, and may generate encoded data for the remaining portions of the prompt.

The teachings of the present disclosure provide, among other things, techniques for reducing latency, such as user perceived latency (UPL) in processing user inputs, which can improve user experience. Computational resources used in processing user inputs may also be reduced.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating an example system 100 for cache management for large language model inference, according to embodiments of the present disclosure. In some embodiments, the system 100 may include a large language model (LLM) orchestrator 130, multiple LLM containers 150a-150n (e.g., a group of LLM containers) and a load balancer 160. The system 100 may process user input data 127 representing a user input from a user 105 (shown in FIG. 7). The user input data 127 may be a natural language input and may be provided by the user 105 as a spoken input or a typed input. The user 105 may provide a different type of input, such as selection of a GUI element via a screen of a user device 110, actuation of a button on the user device 110, a gesture input, etc., and such input(s) may be converted to a natural language representation. The user input data 127, in some embodiments, may be text data or ASR data (ASR hypothesis associated with a confidence score).

Referring to FIG. 1, the LLM orchestrator 130 may receive (step 1) the user input data 127 for processing. The LLM orchestrator 130 may be configured to cause one or more system components to execute, send data to one or more system components, etc. Further details of the LLM orchestrator 130 are described below in relation to FIG. 7. In some embodiments, the LLM orchestrator 130 may be in communication with (or may include) the LLM container(s) 150, which may implement a LLM and corresponding components to enable processing by the LLM.

In some embodiments, the LLM orchestrator 130 may be in communication with multiple LLM containers 150 via the load balancer 160. The load balancer 160 may receive (step 2) the prompt 140. The load balancer 160 may determine which LLM container 150 the user input/request is to be routed. In some examples, the load balancer 160 may route user inputs of the same dialog session to the same LLM container 150 for processing. The prompt 140 may include a session ID or the prompt 140 may be associated with a session ID for the dialog session, and the load balancer 160 may use the session ID to route the prompt 140 to a particular LLM container 150. Further details are described below in relation to FIG. 2.

In some embodiments, the load balancer 160 may route a user input to a particular LLM container 150 based on a similarity to past user inputs that were routed to that LLM container 150. For example, the load balancer 160 may receive the prompt 140 including the user input data 127, the load balancer 160 may determine that the user input data 127 is similar to a first past user input that was processed by the LLM container 150b, and the load balancer 160 may then route the prompt 140 to the LLM container 150b for processing.

The load balancer 160 may select a LLM container from a group of LLM containers 150a-150n to process a prompt. In the example shown in FIG. 1, the load balancer 160 may send (step 3) the prompt 140 to the LLM container 150a. The LLM container 150 may process natural language inputs and generate a corresponding response. The prompt 140 may be an instruction/input for the LLM to respond to a natural language input (e.g., represented in the user input data 127). The prompt may also include other information, such as contextual information corresponding to the user input data 127, the user 105 (e.g., user preferences, user profile, etc.), a user device 110 from which the user input is received (e.g., device type, device location, device state, capabilities, etc.) and other information. In some examples, the prompt may also include actions (e.g., components, APIs, etc.) available to the LLM to select from. In some examples, the prompt may include in-context learning examples to facilitate processing/reasoning by the LLM.

In example embodiments, the LLM container 150 may be any of the language models described below in relation to FIGS. 7, 8 and 9 (e.g., plan generation language model 820, task selection language model 840, shortlister language model 940, etc.), and the LLM orchestrator 130 may generate the prompt 140 in a similar manner as described below in relation to FIGS. 7, 8 and 9 (e.g., prompt data 815, prompt data 835, prompt data 915, etc.).

In some embodiments, the LLM container 150 may include an encoder (e.g., a context encoder) and a decoder (e.g., an iterative decoder). The encoder may generate encoded representations of the prompt and the encoded representations may be processed by the decoder to generate a response to the natural language input. As described herein, to reduce latency and computational costs, the system may store encoded representations of prompts in a cache (e.g., cache 170).

The LLM container 150, in some examples, may perform more than one processing iteration with respect to an individual natural language input and may be configured to follow a processing/reasoning format of: "Think", "Action", "Observe" and "Response." The Think step is the LLM's reasoning process to identify the intermediate task to perform; the Action is given the intermediate task, in this step select actions (APIs, components, etc.) in order to complete the task and generate the command to perform the action; and the Observe step contains the results from performance of the action(s). The Think, Action and Observe steps may be performed for multiple iterations. The Response step is a response to the natural language input generated based on the iterative processing performed via the Think, Action and Observe steps. The Response step may occur once per natural language input. FIGS. 6A-6B, described below, show examples of the foregoing steps.

In some embodiments, as shown in FIG. 1, the LLM container 150 may include a cache manager 155. Each LLM container 150a-150n may include its own cache manager 155. In other embodiments, the system 100 may include a single cache manager 155 configured to manage the different caches 170 of the multiple LLM containers 150.

The cache manager 155 may be configured to manage (e.g., retrieval, storage, removal, etc.) data at a cache 170. The cache 170 may be stored across one or more GPUs 165 (e.g., GPUs 165a-165n). Each of the LLM containers 150a-150n may be in communication with its own corresponding cache 170 that may be stored across multiple GPUs 165. As described herein, in some examples, the load balancer 160 may route user inputs of the same dialog session to the same LLM container 150, which in turn ensures that encoded representations corresponding to that dialog session are stored at the same cache 170 and can be used for processing subsequent user inputs of the dialog session.

The cache 170 may store encoded representations of prompts that have been previously processed/encoded by the LLM container 150. The cache manager 155 may search (step 4) the cache 170 for an encoded representation that corresponds to the prompt 140 that may be used by the LLM container 150 for processing. The LLM container 150 (or the cache manager 155) may receive (step 5) the results of the cache search. In case of a cache hit, the LLM container 150 may receive an encoded representation of the prompt 140, where the encoded representation may have been determined and stored based on the LLM container 150 previously processing the same or similar prompt as the prompt 140. In case of a cache miss, the LLM container 150 may receive an indication that an encoded representation is not stored in the cache 170.

In case of a cache hit, the LLM container 150 may use the stored/cached encoded representation of the prompt 140 to determine a response to the user input data 127. The stored encoded representation may be processed using the decoder of the LLM container 150 to determine the response to the user input data 127.

In some embodiments, the data determined during processing iterations of the LLM container 150 may be stored in the cache 170. Such data may be used to process subsequent dialog turns of a dialog session. Such data may include the LLM's reasoning for the Think, Action, Observe and Response steps (examples shown in FIGS. 6A-6B). To store such data, the cache manager 155 may send the data to the cache 170.

As described herein in detail, the LLM container 150 may retrieve stored/cached data, generated while processing a first dialog turn, when processing a second dialog turn of the dialog session.

The workflow of LLM inference can be split into two stages: (1) encoding that involves performing attention computation on a prompt input and creating a KV cache (storing data in cache 170); (2) iterative Decoding that involves autoregressive decoding where each step/iteration can use the KV cache storing attention computed for the past tokens, and can add the new token KVs into the cache 170 as decoding progresses.

In some embodiments, the data stored in the cache 170 is keys and value representation of a token that is generated using the attention mechanism of the LLM (the encoder of the LLM). The attention mechanism generates a Query, Keys and Value representation/projection of a token, where these projections are tensor representations of the token and are used in the attention computation.

In a transformer-based architecture, Query, Keys and Value are tensors/vectors used to get a better encoding for source and target words. The Query is a vector related to the input that is encoded. The Keys is vector related with what is used as input to output. The Value is a learned vector as a result of calculations, related with input.

Below are formulas showing the attention computation:

$$attention = Softmax((Query * Keys)/scale)$$

$$embedding\ for\ attention\ layer = attention * Value$$

The cache manager 155 stores, in the cache 170, the keys and value representations of the tokens including the prompt. As such, the encoded representations/encoded data stored in the cache 170 may be keys and value representations of individual tokens.

In some embodiments, the cache 170 may store individual entries for individual prompt portions for which encoded data is generated. For example, for an entire first prompt including {[beginning sentence], [context data], [first user input]}, the first encoded representations (e.g., keys and value representations) may correspond to the entirety of the first prompt/all of the tokens in the first prompt, and the cache 170 may store a first entry corresponding to the first encoded representations. As a further example, the cache

170 may store a second entry corresponding to second encoded representations for an entirety of a second prompt.

When encoded representations for a portion of a prompt is determined, the cache 170 may store an entry corresponding to that portion. For example, for a third prompt including {[beginning sentence], [context data] . . . } where the user input is still being determined (e.g., by ASR processing), the third encoded representations for the available portion of the prompt may be determined and the cache 170 may store a third entry corresponding to the third encoded representations. In some examples, when the user input is available and the third prompt is updated to include the user input, fourth encoded representations for the updated portion of the third prompt may be determined and the cache 170 may store a separate fourth entry corresponding to the fourth encoded representations. In other examples, the cache 170 may update the third entry to include the fourth encoded representations instead of storing a separate entry.

The attention computation can constitute a third of all the FLOPS and can consist of a majority of operations which are memory bound and a significant driver of latency. For this reason, caching this operation and avoiding re-computation of attention for tokens already processed in previous time-steps is advantageous.

Figure 15:
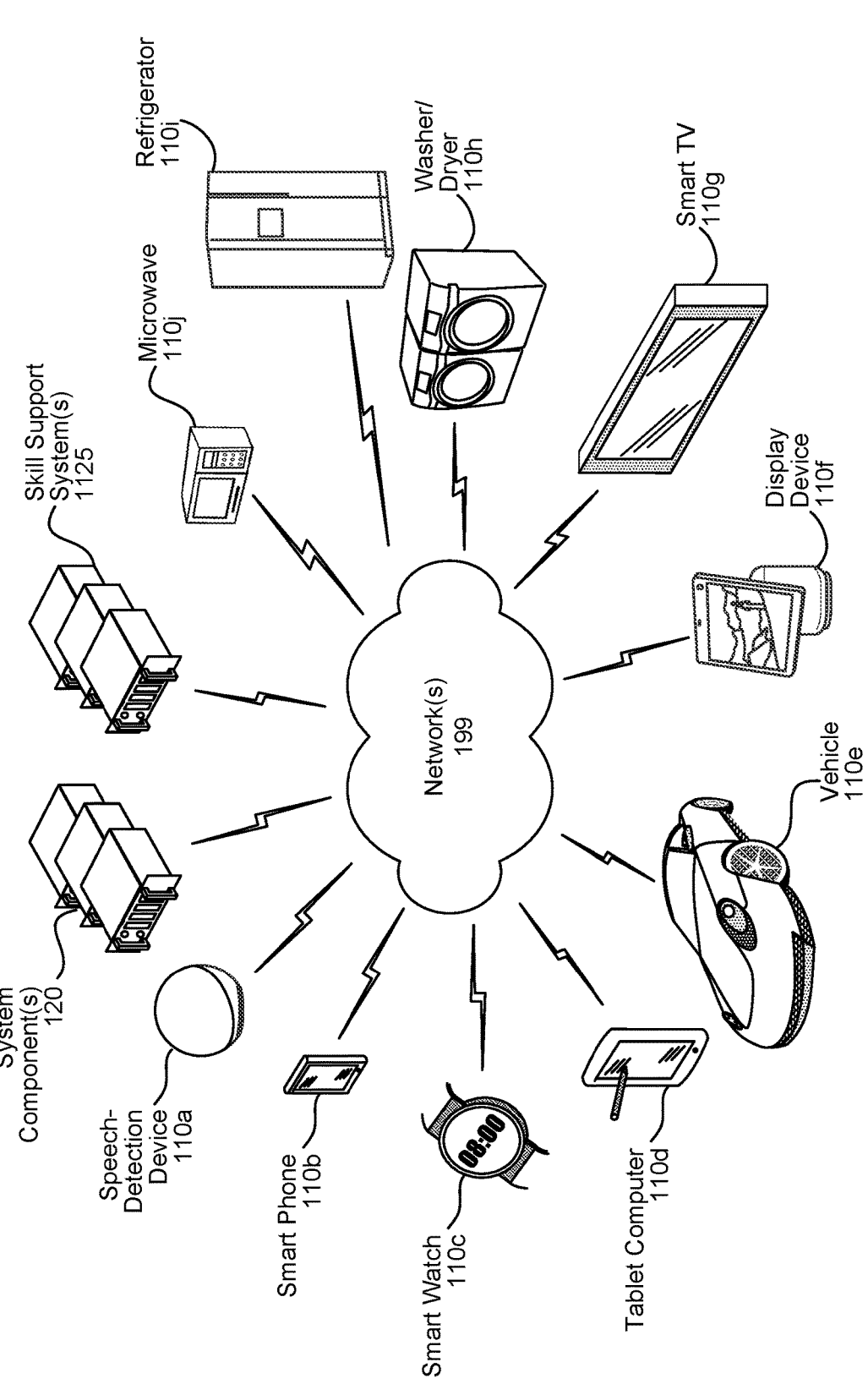
FIG. 15 illustrates an example of a computer network for use with the speech processing system.

FIG. 2 is a conceptual diagram illustrating an example configuration for a system involving use of multiple LLM containers 150, according to embodiments of the present disclosure. Example embodiments may implement a sticky routing mechanism, which, in some cases, may be based on a dialog session ID. For example, the system may include at least a first LLM container 150a, a second LLM container 150b, a third LLM container 150c and a fourth LLM container 150d, each of which may include its own cache (e.g., cache 170 shown in FIG. 1). As shown, the system may include multiple user devices 110 (examples of which are shown in FIG. 15) and may receive user inputs from these multiple user devices 110. The user inputs may be provided by multiple different users 105. In some embodiments, the load balancer 160 may be configured to send data corresponding to user inputs of the same dialog session to the same LLM container. The load balancer 160 may use a session index 235 to determine which LLM container to route the user input (the prompt including the user input) for processing.

For example, as shown in FIG. 2, the system may receive from the user devices 110, a first user input 202, a second user input 204, a third user input 206, and a fourth user input 208. The first user input 202 may be provided by a first user 105a associated with a user ID1 via a first user device 110a associated with a device ID1 and during a first dialog session associated with a session ID1. The second user input 204 may be provided by the first user 105a during the first dialog session (e.g., as a second dialog turn) and as such, is associated with the session ID1. The third user input 206 may be provided by a second user 105b associated with a user ID2 via a second user device 110b associated with a device ID2 and during a second dialog session associated with a session ID2. The fourth user input 208 may be provided by a third user 105c associated with a user ID3 via a third user device 110c associated with a device ID3 and during a third dialog session associated with a session ID3.

The load balancer 160 may send data corresponding to the user inputs 202 and 204 to the first LLM container 150a based on the session index 235 indicating that data corresponding to the session ID1 is routed to the first LLM container 150a (associated with a first container ID). For example, the load balancer 160 may route a first prompt including the first user input 202 to the first LLM container 150a and may store data in the session index representing an association between the session ID1 and the first container ID. When a second prompt including the second user input 204 is ready for processing, the load balancer 160 may determine, using the session index 235, that data corresponding to the session ID1 is processed at the first LLM container 150a, and based on that determination, may send the second prompt including the second user input 204 to the first LLM container 150a.

With respect to the third user input 206, the load balancer 160 may send corresponding data to the third LLM container 150c and may store data, in the session index 235, representing an association between the session ID2 and the third LLM container 150c (associated with a third container ID). For the fourth user input 208, the load balancer 160 may send corresponding data at the fourth LLM container 150d and may store data, in the session index 235, representing an association between the session ID3 and the fourth LLM container 150d (associated with a fourth container ID). Before storing data, the load balancer 160 may check the session index 235 for the session ID corresponding to the user inputs to identify a LLM container for processing. If the session ID is not included in the session index, then the load balancer 160 may select a LLM container for processing, where such selection may be random or may be based on a cache size, available cache memory, active dialog sessions being processed by the LLM container, etc.

The encoded data stored at the cache 170 may be used by the LLM in processing user inputs of the same dialog session. In some embodiments, the encoded data stored at the cache 170 may be used by the LLM in processing user inputs of different dialog sessions. This may be supported by the load balancer 160 routing a user input to a LLM container 150 that processed similar past user inputs, so that encoded data corresponding to the past user inputs may be used in processing the instant user input. In some examples, the load balancer 160 (or another component) may determine that a first/initial user input of dialog session is similar to a past user input of a past dialog session, may determine which LLM container 150a-150n processed the past user input, and may send the prompt including the first/initial user input to the same LLM container. Similarity between a current user input and a past user input may be determined using cosine similarity, semantic similarity techniques, lexically similarity techniques or other techniques.

FIG. 3 is a flowchart illustrating an example process 300 for using cache data that matches a portion of a prompt, according to embodiments of the present disclosure. At a step 302, the cache manager 155 may receive the prompt 140. The cache manager 155 may determine a key value corresponding to the prompt 140. At a step 304, the cache manager 155 may search the cache 170 for a full or partial prompt match using the key value for the prompt 140. In examples, the cache manager 155 may identify a host GPU to search based on a session ID associated with the user input/prompt 140 (as described in relation to FIG. 2).

At a step 307, the cache manager 155 may determine whether a full prompt match is found in the cache 170. If a full prompt match is found, that is the cache 170 stores encoded representation for the entire prompt 140, then at a step 308, the LLM container 150 may process the cached data, corresponding to the full prompt, using a decoder of the LLM.

If a full prompt match is not found, then at a step 310, the cache manager 155 may identify cached data matching a first portion of the prompt 140. At a step 312, the cache manager 155 may identify a second portion of the prompt without cached data match. For example, a prompt may be {User Input: "Dog ate my homework"; Response: I see; User Input: "Also a cat"}. The cache 170 may store encoded representations for a first portion of the prompt "User Input: Dog ate my homework", but may not store encoded representations for a second portion "Response: I see; User Input: "Also a cat." At the step 310, the cache manager 155 may identify the cached data corresponding to the first portion of the prompt, and the step 312 the cache manager 155 may identify the second portion of the prompt.

In some examples, the cache manager 155 may identify a portion of encoded representation for a prompt that matches a portion of the prompt. For example, the cache 170 may store a cache entry corresponding to a prompt "User Input: Dog ate my homework. I don't know what to do." The cache manager 155 may determine that the cache entry is a partial match to the example prompt 140 "User Input: Dog ate my homework." The cache manager 155 may retrieve the encoded representations corresponding to the cache entry, identify a portion of the encoded representations that corresponds to the example prompt 140 and use that portion of the encoded representations for further processing. For example, the cache manager 155 may identify a portion of the encoded representations corresponding to "User Input: Dog ate my homework." In some embodiments, the cache manager 155 may discard the remaining portion of the encoded representations corresponding to "I don't know what to do."

At a step 314, the LLM container 150 may generate encoded representations of the second portion of the prompt 140, for which cached data match is not found. For example, the LLM container 150 may process, using the encoder, the second portion of the prompt "Response: I see; User Input: Also a cat" to generate encoded representations.

At a step 316, the LLM container 150 may process the cached data for the first portion (identified in the step 310) and the generated encoded representations of the second portion (from the step 314) using the decoder of the LLM. In this manner, the system may use cached encoded data for portions of a prompt and generate encoded data for the rest of prompt, which may result in latency and computational cost savings.

Figure 4A:
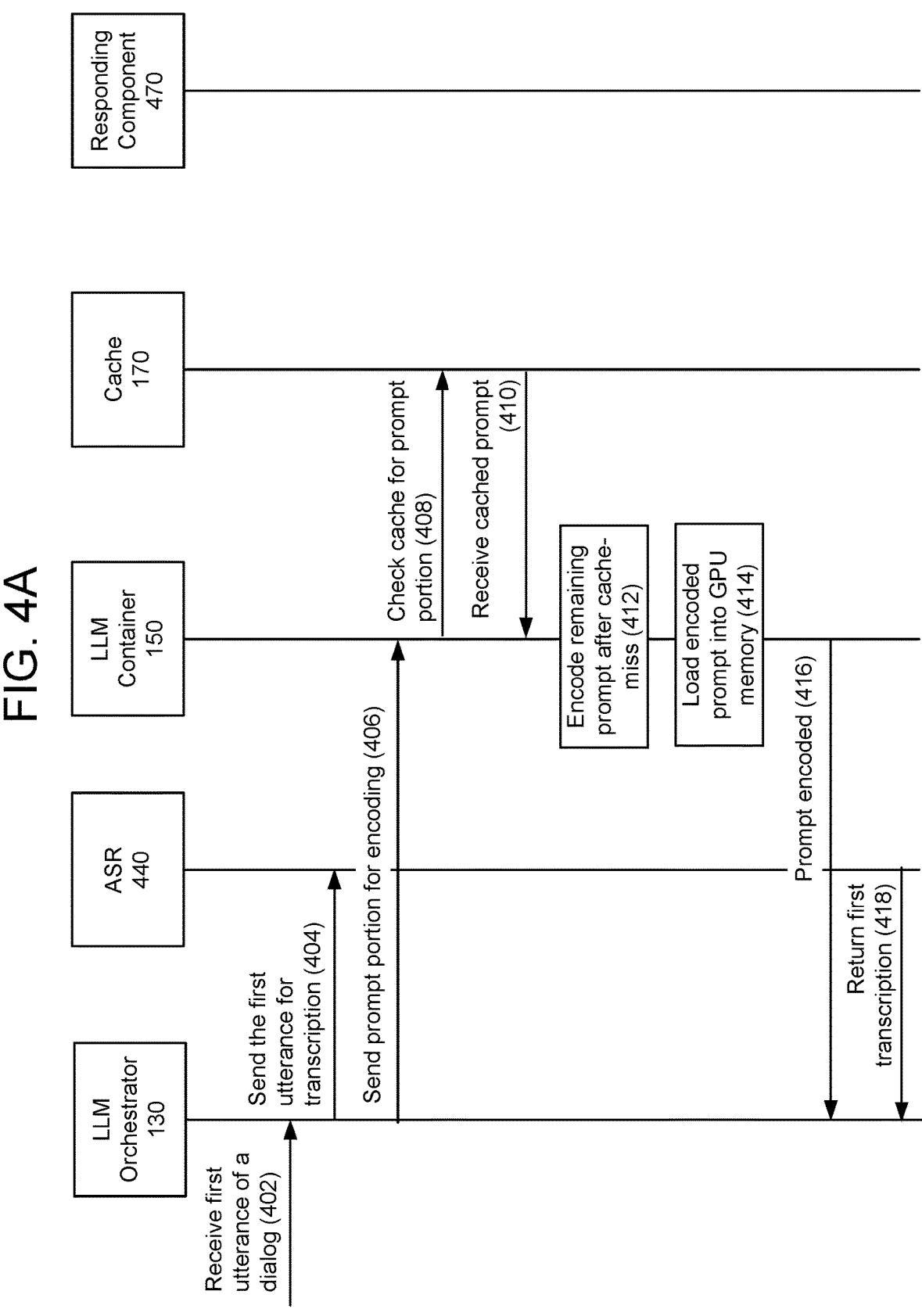
FIG. 4A-4B are signal flow diagrams illustrating an example process of asynchronous prompt encoding and automatic speech recognition (ASR) processing, according to embodiments of the present disclosure.
Figure 4B:
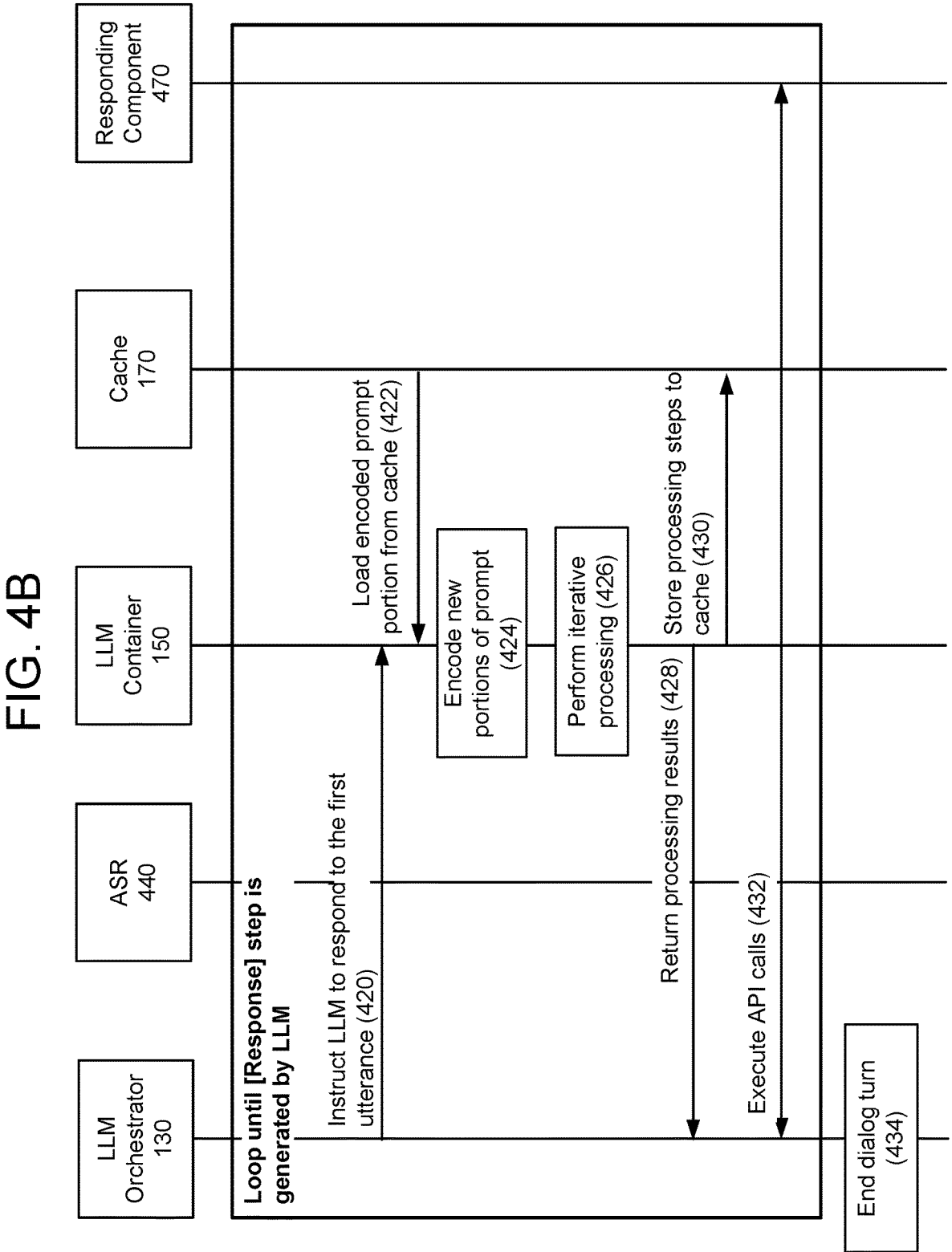

FIG. 4A-4B are signal flow diagrams illustrating an example process of asynchronous prompt encoding and automatic speech recognition (ASR) processing, according to embodiments of the present disclosure. In some embodiments, the LLM orchestrator 130 may be in communication with an ASR component 440. The ASR component 440 may operate as described in detail below in relation to FIG. 11. Additionally, the LLM orchestrator 130 may be in communication with one or more responding components 470. The responding component 470 may be a component capable of performing an action that the LLM container 150 determines is to be performed with respect to a user input/prompt. The responding component 470 may be any one of an API provider(s) 750, a LLM agent(s) 752, a skill component(s) 754, a TTS component 756, etc., described in detail in relation FIGS. 7 and 9.

Referring to FIG. 4A, the LLM orchestrator 130 may receive (402) a first utterance of a dialog. The first utterance may be spoken by the user 105 and the user device 110 may capture audio representing the first utterance. In some embodiments, the LLM orchestrator 130 may receive the audio representing the first utterance. In other embodiments, the LLM orchestrator 130 may receive an indication that audio representing the first utterance is received by the system 100. Based on receiving the first utterance, the LLM orchestrator 130 may send (404) the first utterance to the ASR component 440 for transcription. The LLM orchestrator 130 may send the audio representing the first utterance to the ASR component 440. In other examples, the LLM orchestrator 130 may send an instruction to the ASR component 440 to process the audio, which may be provided by another component the system.

While the ASR component 440 is processing the audio for the first utterance, the LLM orchestrator 130 may send (406), to the LLM container 150, a prompt portion for encoding. The LLM orchestrator 130 may determine a portion of the prompt 140, where the portion may include context information corresponding to the first utterance. Such context information may include user information for the user 105 (e.g., user profile data, user preferences, user location, etc.), device information for the user device 110 (e.g., device ID, device type, device profile, device location, capabilities, etc.), situational context (e.g., time, date, etc.), and the like. For example, the prompt portion may include the context data 805 (shown in FIG. 8). Some of the contextual information included in the prompt may be available while ASR processing is occurring.

The LLM container 150 may check (408) the cache 170 for the prompt portion. That is, the LLM container 150 (using the cache manager 155) may determine whether the cache 170 stores encoded representations corresponding to the prompt portion. As described herein, the cache manager 155 may identify encoded representations for the entire given prompt or for a portion of the given prompt. The LLM container 150 may receive (410) the cached prompt data from the cache 170.

When encoded representations for a portion of the given prompt is identified, the LLM container 150 may encode (412) the remaining prompt portion for which cached data is not identified (cache-miss). In case cached data is not identified for the entire given prompt, then the LLM container 150 may encode the entire given prompt.

The LLM container 150 may load (414) the encoded prompt into the GPU memory, where the encoded prompt may be a combination of cached data and generated encoded data. The encoded prompt may be used by the LLM container 150 when processing a subsequent dialog turn of the dialog session. The LLM container 150 may return (416) an indication to the LLM orchestrator 130 that the prompt portion has been encoded.

While the LLM container 150 is encoding the prompt portion, the ASR component 440 may have generated a first transcription for the first utterance. The ASR component 440 may return (418) the first transcription to the LLM orchestrator 130.

Referring to FIG. 4B, next few steps described here may be performed on a loop until a Response step is generated by the LLM container 150. The LLM orchestrator 130 may instruct (420) the LLM container 150 to respond to the first utterance, where such instruction is provided via a prompt. This prompt may include the prompt portion previously sent (406) to the LLM container 150 for encoding and may also include the first transcription representing the first utterance. The prompt may also include other information that may be available for processing.

The LLM container 150 may load (422) the encoded prompt portion from the cache 170, where the encoded prompt portion was previously loaded (at 414) in the cache 170. The LLM container 150 may encode (424) new portions of the prompt that are different than the prompt portion for which the cache 170 stored encoded representations. That is, the LLM container 150 may encode new portions of the prompt that include the first transcription and any other additional information that was not included in the prior prompt portion.

After encoding the prompt, the LLM container 150 may perform (426) iterative processing using the encoded prompt—the encoded new portions of the prompt and the encoded prompt portion retrieved from the cache 170. Based on the iterative processing, the LLM container 150 may return (428) the processing results to the LLM orchestrator 130. The LLM container 150 may also store (430) the processing steps to the cache 170. For example, the processing results may include the intermediate processing steps (e.g., Think, Action, Observe) performed by the LLM during an iteration.

The processing results from the LLM container 150 may include one or more actions that are to be performed to determine a response to the first utterance. The LLM orchestrator 130 may execute (432) one or more API calls to perform the action(s) indicated in the LLM processing results. In executing the API call(s), the LLM orchestrator 130 may communicate with one or more responding components 470. After performing the action(s), the LLM orchestrator 130 may end (434) the dialog turn of the first utterance. In ending the dialog turn, the LLM orchestrator 130 may cause presentation of an output responsive to the first utterance. Processing of example utterances is described in relation to FIGS. 6A-6B.

Figure 5:
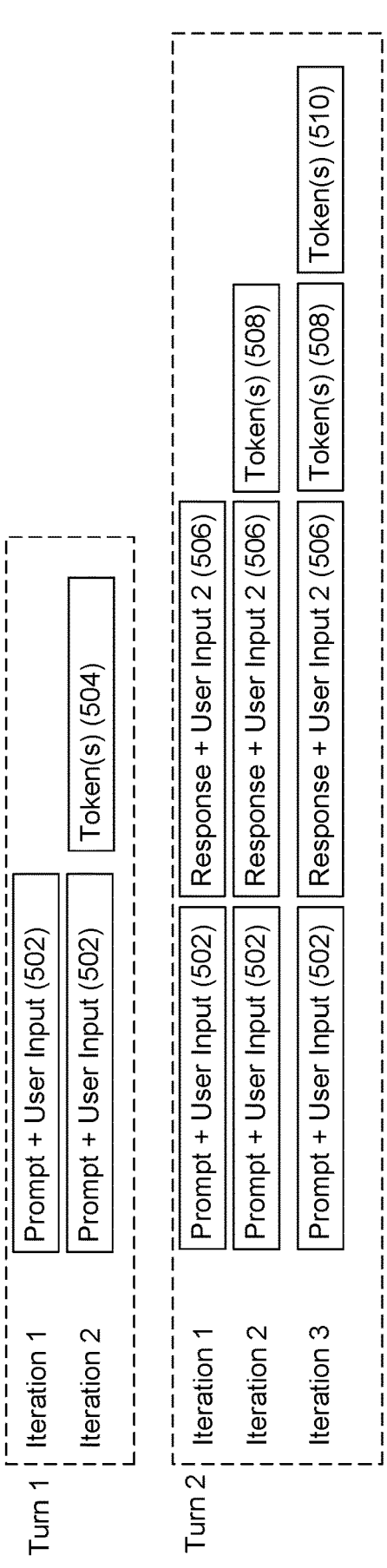
FIG. 5 conceptually illustrates tokens and data that are stored in a cache for dialog turns and model processing iterations, according to embodiments of the present disclosure.

FIG. 5 conceptually illustrates prompt data for which encoded representations may be stored in the cache 170 for multiple dialog turns and multiple model processing iterations, according to embodiments of the present disclosure. Illustrated in FIG. 5 are two dialog turns-turn 1 and turn 2. For turn 1, the LLM container 150 may perform two processing iterations. During iteration 1 of turn 1, the LLM container 150 may process prompt data 502 including some prompt portion and the user input provided by the user 105 and encoded representation of the prompt data 502 may be stored in the cache 170. As result of iteration 1 processing, the LLM container 150 may generate token(s) 504. These tokens 504 may appended to the prompt data 502 of iteration 1 to generate prompt data for iteration 2. Thus, as shown, during iteration 2 of turn 1, the LLM container 150 may process the prompt data 502 and the token(s) 504 and the cache 170 may be updated to store encoded representations of the token(s) 504. Based on processing, the LLM container 150 may generate a response to the user input of turn 1.

For turn 2, the LLM container 150 may perform three processing iterations. For turn 2, the LLM container 150 may process the prompt data 502 for turn 1 and additional data 506 including the response to turn 1 user input and the current user input of turn 2. The cache 170 may store encoded representations of the prompt data 502 and the additional data 506. In some examples, the LLM container 150 may receive data 502 and data 506 included in one/the same prompt input. In some embodiments, the cache manager 155 may delete encoded representations corresponding to the token(s) 504 from the cache 170 when processing of turn 2 begins.

For iteration 2 of turn 2, the LLM container 150 may process the prompt data 502, the additional data 506 and token(s) 508 which may be generated during iteration 1 of turn 2 processing. The cache 170 may store encoded representations of the prompt data 502, the additional data 506 and the token(s) 508. Similarly, for iteration 3 of turn 2, the cache 170 may store encoded representations of the prompt data 502, the additional data 506, the token(s) 508 and token(s) 510, which may be generated during iteration 2 of turn 2 processing.

FIGS. 6A-6B show example user inputs and corresponding model processing data for which encoded data may be stored in the cache 170, according to embodiments of the present disclosure. FIG. 6C is a flowchart showing an example process 650 that may be performed to store encoded data in the cache 170 and to discard encoded data from the cache 170. The process 650 is described in conjunction with the examples shown in FIGS. 6A and 6B.

Referring to FIG. 6C, at a step 652, the LLM container 150 may receive a first prompt including a first user input of a dialog session. Shown in FIG. 6A is text 602 "You are an intelligent AI system . . . " which may be included at a beginning of the first prompt. The text 602 may be a prompt portion that can be encoded asynchronously as ASR processing is being performed. Text 604 represents an example first user input for turn 1 that may be included in the first prompt to the LLM. At a step 654 of the process 650, the LLM container 150 may store first encoded data corresponding to the first prompt. That is, encoded data corresponding to the text 602 and 604 may be stored in the cache 170.

At a step 656 of the process 650, using the first encoded data, the LLM container 150 may perform a first iteration of processing steps. The LLM container 150 may process the first encoded data corresponding to the text 602 and 604, and may generate the Think and Action steps shown in FIG. 6A. Text 606 represents the output of the Think step and text 608 represents the output of the Action step. At a step 658 of the process 650, the LLM container 150 may store, in the cache 170, second encoded data corresponding to the first iteration of processing steps. For example, encoded representations of the text 606 and 608 may be stored in the cache 170 for processing iteration 1. The Action step (text 608) may cause the system to execute an API call to QA (Question-Answering) component, which may be one of the responding components 470 shown in FIGS. 4A-4B.

At a step 660 of the process 650, using the first encoded data and the second encoded data, the LLM container 150 may perform a second iteration of processing steps. For processing iteration 2 of turn 1, the LLM container 150 may generate text 610 representing the output of the Observe step, which may be a response to the API call from the Action step (text 608). For the processing iteration 2, the LLM container 150 may process data that includes the text 602, 604, 606, 608 and 610 as shown in FIG. 6A. To process such data, the cache manager 155 may retrieve, from the cache 170, the encoded representations of the text 602, 604, 606 and 608, which were loaded into the cache 170 during processing iteration 1. For the text 610, the LLM container 150 may generate encoded representations, which may then be loaded into the cache 170. The LLM container 150 may process the cached encoded representations and the generated encoded representations to determine the Think step represented in text 612 and the Action step represented in text 614.

Now referring to FIG. 6B, data for which encoded representations may be stored in the cache 170 for processing iteration 3 that is the end of turn 1. Based on the Action step (text 614), the LLM container 150 may generate the Observe step represented in text 616. Since all actions in response to the user input are performed, at a step 662 of the process 650 shown in FIG. 6C, the LLM container 150 may determine a response to the first user input. The LLM container 150 may generate the Response step represented in text 618. The text 618 or data representing the text 618 (e.g., synthesized speech) may be presented to the user 105 in response to the user input shown in text 602. At a step 664 of the process 650, the LLM container 150 may store, in the cache 170, third encoded data corresponding to the response (e.g., text 618). In some embodiments, the cache 170 may be updated to store encoded representations of the text 612, 614, 616 and 618.

In other embodiments, the cache manager 155 may selectively store some of the encoded data in the cache 170 for processing of turn 2 of the dialog. Such selectively storage may be performed based on processing reaching end of a turn, which may be identified based on the LLM container 150 generating the Response step. At a step 666 of the process 650, based on the response to the first user input being determined, the cache manager 155 may discard the second encoded data from the cache 170. For example, the cache manager 155 may discard/delete, from the cache 170, encoded representations corresponding to intermediate processing steps Think, Action and Observe steps of processing iterations of turn 1 (i.e., the text 606, 608, 610, 612, 614, 616). If encoded representations for these steps are not stored in the cache 170, the cache manager 155 may determine to not store these encoded representations or may discard these encoded representations. For example, encoded representations for the text 616 may not have been stored in the cache 170. The cache manager 155 may store encoded representations (or keep stored the encoded representations) in the cache 170 for the text 602, 604 and 618 for processing a second turn of the dialog.

Removing of certain data from the cache 170 can ensure that the cache size is manageable. In some embodiments, the Think, Action and Observe steps are not carried over for processing a new utterance/subsequent dialog turn, therefore, encoded data corresponding to these steps may be discarded from the cache 170. The Think, Action and Observe steps are carried over (by including in the prompts) from one processing iteration to the next for the same utterance/dialog turn. As such, encoded data corresponding to these steps may be stored until the end of the dialog turn is reached (for the life of the dialog turn). The user input and corresponding response of a dialog turn is carried over for processing of next utterances/next dialog turns. As such encoded data corresponding to the user input and the corresponding response may be stored until the end of the dialog session (for the life of the dialog session).

Referring to FIGS. 6B and 6C, at a step 668 of the process 650, the LLM container 150 may receive a second prompt including the first user input, the response and a second user input of the dialog session. For turn 2, the LLM container 150 may receive the example second prompt shown in FIG. 6B. The second prompt may include, similar to the first prompt corresponding to turn 1, the text 602. In some examples, the text 602 may be text that is included in a number of prompts, if not all prompts. The second prompt may also include the user input of the previous dialog turn-turn 1, i.e., the text 604, and the response to the user input of the previous dialog turn, i.e., the text 618. The second prompt may also include the user input of the current dialog turn-turn 2, represented in text 620. Upon receipt, the LLM container 150 may determine an encoded representation of the second prompt, which may involve the cache manager 155 retrieving, from the cache 170, encoded representations of the text 602, 604 and 618, and may involve the LLM container 150 generating an encoded representation of the text 620. As such, at a step 670 of the process 650, the LLM container 150 may store, in the cache 170, fourth encoded data corresponding to the second user input (e.g., text 620). At a step 672, using the first, third and fourth encoded data, the LLM container 150 may perform an iteration of processing for the second user input/turn 2 of the dialog session.

In this manner, the system takes advantage of the fact that prompts provided to an LLM for processing turns of dialog may include an overlap of information, and instead of generating encoded data for already seen information during a dialog session, the LLM may retrieve the encoded data from a cache.

As described above, the cache management techniques may be used with any of the LLMs described below in relation to the following figures.

Figure 7:
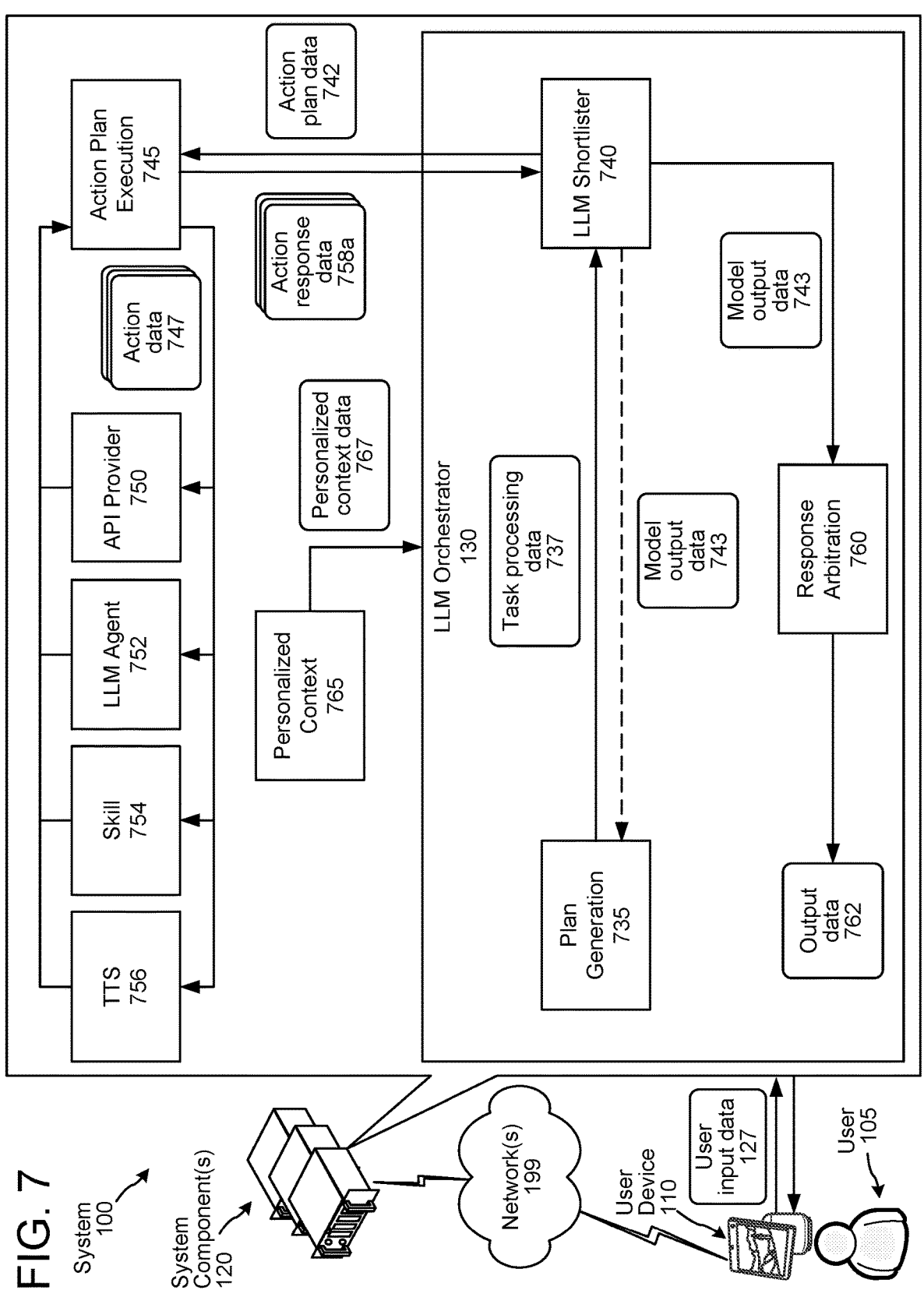
FIG. 7 is a conceptual diagram illustrating example components and processing for determining one or more components configured to perform an action associated with the task, according to embodiments of the present disclosure.

FIG. 7 illustrates a system 100 for using one or more language models to determine an action responsive to a user input. As shown in FIG. 7, the system may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as a large language model (LLM) orchestrator component 130, a personalized context component 765, an action plan execution component 745, an API provider component 750, an LLM agent component 752, a skill component 754, and a TTS component 756. The LLM orchestrator component 130 may include a plan generation component 735, an LLM shortlister component 740, and a response arbitration component 760. In some embodiments, the response arbitration component 760 may exist elsewhere in the system component(s) 120 outside of the LLM orchestrator component 130.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be a LLM. An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input text using a bidirectional encoding, and the decoder may use that representation to perform some task. In some such embodiments, one or more of the language model may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model [ref #] may be pre-trained for approximately 1 trillion tokens. Being trained on CLM tasks, the one or more language models may be capable of in-context learning. An example of such a LLM is Alexa Teacher Model (Alexa™).

In other embodiments, where one or more of the language models are an LLM, the one or more language models may be a decoder-only architecture. The decoder-only architecture may use left-to-right (unidirectional) encoding of the input text. An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models. Such machine learning model(s) may receive text and/or other types of data as inputs, and may output text and/or other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.). For example, for an example prompt "how do I cook rice?", the LLM may output a recipe (e.g., a step-by-step process) to cook rice. As another example, for an example prompt "I am hungry. What restaurants in the area are open?", the LLM may output a list of restaurants near the user that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 130 may generate prompt data representing a prompt for input to the language models. As shown in FIG. 7, the system component(s) 120 receive user input data 127, which may be provided to the LLM orchestrator component 130. In some instances, the user input data 127 may correspond to a text or tokenized representation of a user input. For example, the user input data may include input text (or tokenized) data when the user input is a typed natural language user input. For further example, prior to the LLM orchestrator component 130 receiving the user input data 127, another component (e.g., an automatic speech recognition (ASR) component 1150) of the system 100 may receive audio data representing the user input. The ASR component 1150 may perform ASR processing on the audio data to determine ASR data corresponding to the user input, which may correspond to a transcript of the user input. As described below, with respect to FIG. 11, the ASR component 1150 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 1150 level of confidence that the corresponding hypothesis represents what the user said. The ASR component 1150 may also determine token scores corresponding to each token/word of the ASR hypothesis, where the token score indicates the ASR component's 1150 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

In some embodiments, the LLM orchestrator component 130 may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 110 (e.g., a smartphone, a smart speaker, etc.) to present an alert to the user. The LLM orchestrator 130 may process the input data to generate tasks that may cause the foregoing example actions to be performed.

The user input data 127 may be received at the LLM orchestrator component 130 of the system component(s) 120, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein below with respect to FIG. 8. In instances where the plan generation component 735 generates more than one task to be completed in order to perform the action responsive to the user input, the plan generation component 735 may further maintain and prioritize the list of tasks as the processing of the system 100 with respect to the user input is performed. In other words, as the system 100 processes to complete the list of tasks, the plan generation component 735 may (1) incorporate the results of the processing performed to complete the tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The plan generation component 735 may generate and send task processing data 737 representing the selected task to be completed and various other information needed to perform further processing with respect to the task (e.g., the user input data 127, an indication of the selected task, results of processing performed for previous tasks, the remaining task(s), and context data associated with the user input data 127, as described in detail herein below with respect to FIG. 8) to the LLM shortlister component 740.

The LLM shortlister component 740 may be configured to determine one or more components (e.g., APIs, skill component(s) 754, LLM agent component(s) 752, TTS component 756, etc.) configured to perform an action related to the user input or the current task. The LLM shortlister component 740 may further be configured to generate and cause the execution of a request(s) (e.g., an API call(s)) for the one or more components to provide an output(s) such as a description(s) representing the action the components are configured to/will perform with respect to the user input or the current task. Such requests may be represented in the action plan data 742 sent to the action plan execution component 745. The action plan execution component 745 may identify the request(s) in the action plan data 742 and cause the corresponding components (e.g., the API provider component 750, the LLM agent component 752, the skill component 754, and/or the TTS component 756) to generate action response data 758a-n representing the requested output(s), where individual action response data 758a may be provided by/correspond to a particular responding component-one of the API provider component 750, the LLM agent component 752, the skill component 754, and/or the TTS component 756. In some embodiments, the action response data 758 may include an identifier (e.g., a component name, an alphanumerical value associated with the component, etc.) for the component providing the data. The LLM shortlister component 740 receives and processes the action response data 758a-n and generates model output data 743 representing the output(s) (e.g., relevant outputs, selected outputs, ranked outputs, etc.) for further processing (e.g., as described in detail herein below with respect to FIG. 9). If the LLM shortlister component 740 determines that there are no remaining tasks to be completed, the LLM shortlister component 740 may send the model output data 743 to the response arbitration component 760.

The response arbitration component 760 processes the model output data 743 to determine whether completion of the one or more tasks by the system 100 results in performance of the action responsive to the user input. In other words, the response arbitration component 760 processes the model output data 743 (representing the actions to be performed in response to the user input) and (1) selects one or more of the actions to be output to the user; (2) generates a natural language summary of one or more of the actions; and/or (3) determines that none of the actions are responsive to the user input. For example, the response arbitration component 760 may process the model output data 743 to determine if one or more of the actions performable by the API(s) (e.g., represented by the natural language descriptions) are responsive to the current task. If the response arbitration component 760 determines that none of the actions are responsive to the user input, then the response arbitration component 760 may send an instruction to the personalized context component 765 to generate clarifying information (e.g., personalized context data 767) for the user input. Additionally, or alternatively, the response arbitration component 760 may generate a natural language question to be output to the user requesting the clarifying information. In such instances, the system 100 (e.g., the plan generation component 735, the LLM shortlister component 740, and/or the response arbitration component 760) may process as described herein with further respect to the clarifying information (e.g., the personalized context data 767 and/or the user-provided clarifying information) to perform the action responsive to the user input.

Figure 8:
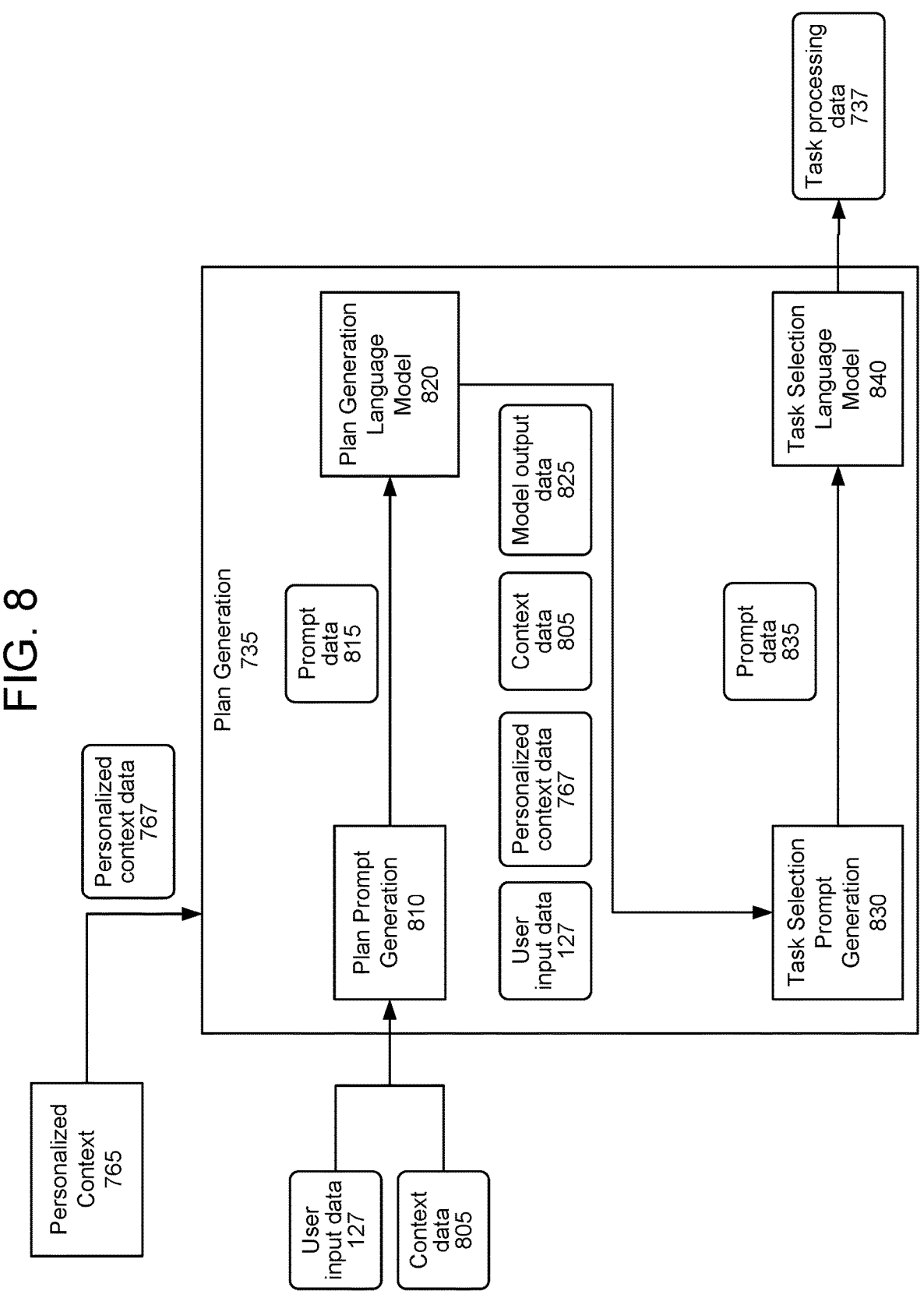
FIG. 8 is a conceptual diagram illustrating example components and processing of a plan generation component, according to embodiments of the present disclosure.

FIG. 8 illustrates example processing of the plan generation component 735. As shown in FIG. 8, the plan generation component 735 may include a plan prompt generation component 810, a plan generation language model 820, a task selection prompt generation component 830, and a task selection language model 840.

As further shown in FIG. 8, the user input data 127 is received at the plan prompt generation component 810. The plan prompt generation component 810 processes the user input data 127 to generate prompt data 815 representing a prompt for input to the plan generation language model 820. In some embodiments, the plan prompt generation component 810 may further receive an indication of one or more remaining tasks to be completed with respect to the user input data 127. For example, if the current iteration of processing with respect to the user input data 127 is a subsequent iteration of processing (e.g., the system previously determined that more than one task is to be completed in order to perform an action responsive to the user input data 127 and has previously performed at least a first task of the more than one tasks), then the plan prompt generation component 810 may further receive an indication of the remaining tasks to be completed. In such embodiments, the plan prompt generation component 810 may further receive an indication of the completed task(s) and/or result(s) of the processing performed to complete the task(s). The plan prompt generation component 810 may further receive context data 805 representing various contextual signals associated with the user input data 127, such as weather information, time of day, device information associated with the device that sent the user input data 127 (e.g., device ID, device states, historical device interaction data, etc.). Such prompt data 815 may be generated based on combining the user input data 127 and the context data 805 (and, in some embodiments, the indication of the remaining task(s), completed task(s), and/or the results of the processing performed to complete the task(s)). In some embodiments, the prompt data 815 may be generated further based on personalized context data 767 representing one or more contextual signals associated with a user that provided the user input, such as information associated with a user profile of the user (e.g., user ID, user behavioral information, user preferences, age, gender, historical user interaction data, devices associated with the user profile, etc.), which may be determined using, for example, a user recognition component 1195. In some embodiments, an indication of the user and/or user profile may be included in the user input data 127 (e.g., as included in the output of the ASR component 1150.). In some embodiments, the personalized context data 767 may include dialog history data representing one or more user inputs and corresponding system-generated responses for a current interaction between the user and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The plan prompt generation component 810 may receive the personalized context data 767 from a personalized context component 765. The personalized context component 765 may be configured to determine and return contextual information associated with a user input to the plan prompt generation component 810, which the plan prompt generation component 810 may combine with the user input data 127 to generate the prompt data 815. In some embodiments, the personalized context component 765 may query various components and/or storages (e.g., the profile storage 1170) for the contextual information. In some embodiments, the personalized context component 765 may include a storage including one or more portions of the contextual information. In other embodiments, the personalized context component 765 may be/implement an LLM. In such embodiments, the personalized context component 765 may be finetuned on personalized information for one or more users, as is discussed in more detail herein below. Further, in such embodiments, the personalized context component 765 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 767) associated with the prompt.

The personalized context component 765 may be caused to generate and return the personalized context data 767 based on the system 100 determining that clarifying information is needed in order to complete a task associated with a user input. For example, one or more of the components of the system 100 (e.g., the plan generation language model 820, the task selection language model 840, the shortlister language model 940, the response arbitration component 760) may determine that an ambiguity exists in the user input (or the data determined/generated as a result of processing with respect to the user input). In such examples, the personalized context component 765 may receive the user input, the current task, and/or model output data indicating that an ambiguity exists/clarifying information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 765 may process as described herein above to generate the personalized context data 767 (e.g., "The user prefers [Music Streaming Service 1].")

In some embodiments, plan prompt generation component 810 (or another component of the system 100) may process the context data 805, the personalized context data 767, the user input data 127, and/or the result of processing performed to complete a task associated with the user input data 127 to generate a natural language representation of the user input (represented by the user input data 127) that is updated to include the contextual information of the personalized context data 767 (e.g., a contextual rewrite of the user input). Thereafter, the plan prompt generation component 810 may process to generate the prompt data 815 using the updated user input data.

In some embodiments, the prompt data 815 may be an instruction for the plan generation language model 820 to determine one or more tasks (e.g., steps/actions) that are to be completed in order to perform an action responsive to the user input given the other information (e.g., the personalized context data 767, the indication of the remaining task(s), the indication of the completed task(s), and/or the corresponding response(s)) included in the prompt data 815.

In some embodiments, the plan prompt generation component 810 may also include in the prompt data 815 a sample processing format to be used by the plan generation language model 820 when processing the prompt. In some embodiments, the plan prompt generation component 810 may generate the prompt data 815 according to a template format. For example, the prompt data 815 may adhere to a template format of:

{
Create a new task if necessary to help complete a request to [user input data 127 (or a representation of a determined intent of the user input data 127].
Here are the completed tasks, their results, user inputs, and context so far:
[completed tasks, results of processing performed to complete the tasks, dialog history, context data 805, personalized context data 767]
These are the remaining tasks to be completed:
[remaining task data]
Based on the result, create new tasks to be completed, if necessary.
Return the tasks as an array.
}

In some embodiments, the template format may instruct the plan generation language model 820 as to how it should process to generate the one or more tasks (e.g., steps) that are to be completed in order to perform the action responsive to the user input. In some embodiments, the format may further include an indication, such as a label of "User:" indicating the following string of characters/tokens as the user input. In some embodiments, the format may further include a label of "Thought:" instructing the plan generation language model 820 to generate an output representing the determined interpretation of the user input by the plan generation language model 820 and/or an action that should be taken (e.g., the user is requesting [intent of the user input], the user is trying to [intent of the user input], need to determine [information needed to properly process the user input] etc.) In some embodiments, the format may further include an indication of "Observation:" indicating the following string of characters/tokens as the result of performance of an action determined by the plan generation language model 820/the plan generation language model 820's interpretation of the result of the performance of the action determined by the plan generation language model 820 (e.g., the completed tasks and/or their results). In some embodiments, the format may further include an indication of "Response:" instructing the plan generation language model 820 to generate a response (e.g., one or more tasks to be completed to perform an action responsive to the user input) to the prompt.

Following such a template format, for example, and for a user input of "turn on all of the lights except the garage," the plan prompt generation component 810 may generate example prompt data 815a:

{
Create a new task if necessary to help complete a request to turn on all of the lights except the garage.
Here are the completed tasks, their results, user inputs, and context so far:
[ ]
These are the remaining tasks to be completed:
[ ]
Based on the result, create new tasks to be completed, if necessary.
Return the tasks as an array.
}

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The plan prompt generation component 810 may process the user input, corresponding context data, the remaining task list, and results of processing performed with respect to previous tasks (e.g., the users pizza preference, determined, for example, by the personalized context component 765) to generate example prompt data 815a:

{
Create a new task if necessary to help complete a request to order some pizza for dinner.
Here are the completed tasks, their results, user inputs, and context so far:
Completed tasks:
Identify user pizza preference: user ordered Brooklyn style pizza from [Company name]

These are the remaining tasks to be completed:
Find application to order pizza
Based on the result, create new tasks to be completed, if
    necessary.
Return the tasks as an array.
}
In some embodiments, the plan prompt generation component 810 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 815 may include "Please generate a polite, respectful, and safe response and one that does not violate protected class policy."

The plan generation language model 820 processes the prompt data 815 to generate model output data 825 representing one or more predicted tasks to be completed in order to perform the action responsive to the user input. For example, based on processing the first example prompt data provided above, the plan generation language model 820 may output model output data: {"turn on all of the lights except the garage light,"} or the like. For further example, as discussed above, based on processing prompt data corresponding to the user input "please order some pizza for dinner" the plan generation language model 820 may output model output data: {"identify user pizza preference;" "find application that enables ordering of pizza," or the like. After the first task of "identify user pizza preference" is complete, and based on processing the second example prompt data provided above, the plan generation language model 820 may further output model output data: {"find an application to order pizza" "find API to order [Company name] pizza,"} or the like. In some embodiments, the threshold for determining the one or more tasks may be such that the plan generation language model 820 is encouraged to generate multiple predicted tasks for a given user input, where the system 100 may parse and filter the list of tasks during downstream processing (e.g., during the processing of the task selection language model 840). For example, based on processing the first example prompt data provided above, the plan generation language model 820 may output model output data: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 825 is sent to the task selection prompt generation component 830, which processes the model output data 825 to generate prompt data 835 representing a prompt for input to the task selection language model 840. In some embodiments, such prompt data 835 may be generated based on combining the user input data 127, the context data 805, the personalized context data 767, the prompt data 815, and/or the model output data 825. In some embodiments, the plan generation component 735 may include another component that parses the model output data 825 to determine the one or more tasks and may send a representation of the one or more tasks to the task selection prompt generation component 830.

In some embodiments, the prompt data 835 may be an instruction for the task selection language model 840 to select a task of the one or more tasks that is to be completed first (e.g., completed during the current iteration of processing) given the information (e.g., user input data 127, the personalized context data 767, and the one or more tasks)

included in the prompt data 835. In some embodiments, the prompt data 835 may further include an instruction for the task selection language model 840 to determine a priority of the one or more tasks (e.g., an ordered list representing the order in which the one or more tasks are to be completed). As discussed above, with respect to the plan prompt generation component 810, in some embodiments, the task selection prompt generation component 830 may also include in the prompt data 835 a sample processing format to be used by the task selection language model 840 when processing the prompt. Similarly, in some embodiments, the task selection prompt generation component 830 may generate the prompt data 835 according to a template format, such as:
{
Select the top prioritized task given the ultimate goal of
    [user input data 127 (or a representation of a deter-
    mined intent included in the user input data 127]
Here are the completed tasks, their results, and user inputs
    so far:
[completed tasks, results of processing performed to com-
    plete the tasks, dialog history, context data 805, per-
    sonalized context data 767]
Here are the task candidates:
[remaining tasks]
Return your selected task, return None if the goal is
    achieved or indicate existing ambiguities.
}
In some embodiments, the template format may instruct the task selection language model 840 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 830 may generate example prompt data 835a:
{
Select the top prioritized task given the ultimate goal of
    turn on all of the lights except the garage
Here are the completed tasks, their results, user inputs,
    and context so far:
[ ]
Here are the task candidates:
Turn on all of the lights except the garage light
Return your selected task, return None if the goal is
    achieved or indicate existing ambiguities.
}
For further example, for the second example user input provided above of "please order some pizza for dinner," the task selection prompt generation component 830 may generate example prompt data 835a:
{
Select the top prioritized task given the ultimate goal of
    please order some pizza for dinner
Here are the completed tasks, their results, user inputs and
    context so far:
Completed tasks:
    Identify user pizza preference: user ordered Brooklyn
        style pizza from [Company name]
Here are the task candidates:
find an application that sells pizza
find API that sells [Company name] pizza
Return your selected task, return None if the goal is
    achieved or indicate existing ambiguities.
}

In some embodiments, the task selection prompt generation component 830 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 840 processes the prompt data 835 to generate model output data representing the task to be completed first and/or a prioritization of the one or more tasks. For example, based on processing the first example prompt data provided above, the task selection language model 840 may output model output data: {"1. Turn on all of the lights except the garage light,"} or the like. For further example, based on processing the second example prompt data provided above, the task selection language model 840 may output model output data: {"1. Find an API that sells [Company name] pizza,"} or the like. In some embodiments, during processing of the task selection language model 840 to select and/or prioritize the one or more tasks, the task selection language model 840 may update the task list to remove any redundant and/or conflicting tasks. For example, for the second example prompt data, the task selection language model 840 may determine that the remaining tasks of "find an application that sells pizza" and "find an API that sells [Company name] pizza" are redundant, and that "find an API that sells [Company name] pizza has a higher priority. Therefore, the task selection language model 840 may remove the task of "find an application that sells pizza" from the remaining task list. Thereafter, the plan generation component 735 (or another component of the plan generation component 735) may process the model output data of the task selection language model 840 to determine task processing data 737 representing the user input data 127, the context data 805, the personalized context data 767, and/or the task selected by the task selection language model 840 to be completed first. In some embodiments, the task processing data 737 may include the remaining one or more tasks and/or may indicate the prioritization of the one or more tasks, as determined by the task selection language model 840. The task processing data 737 may be sent to the LLM shortlister component 740, which is described in detail herein below with respect to FIG. 9.

Figure 9:
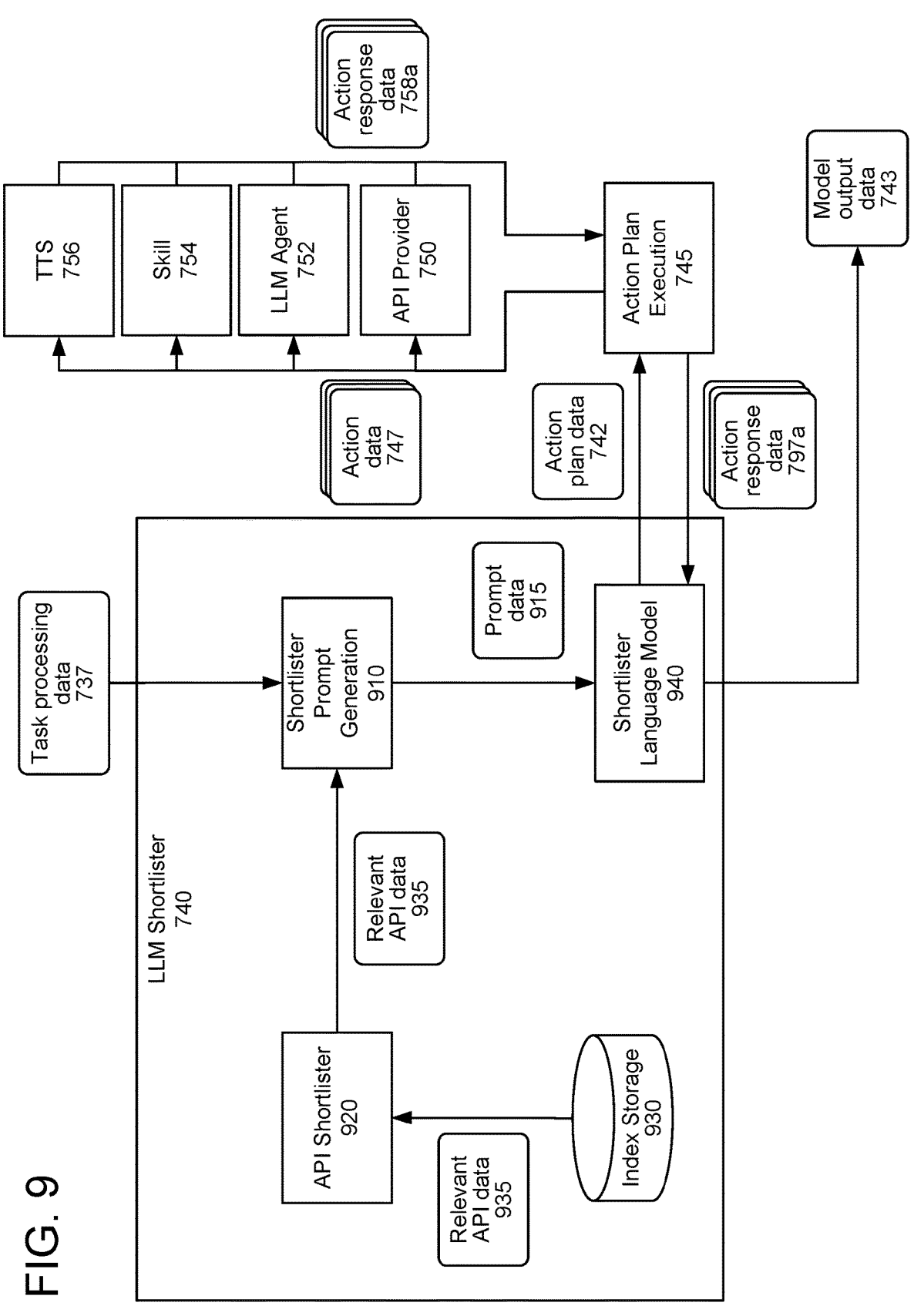
FIG. 9 is a conceptual diagram illustrating example components and processing of an LLM shortlister, according to embodiments of the present disclosure.

FIG. 9 illustrates example processing of the LLM shortlister component 740. As shown in FIG. 9, the LLM shortlister component 740 may include an index storage 930, an API shortlister component 920, a shortlister prompt generation component 910, and a shortlister language model 940.

As further shown in FIG. 9, the task processing data 737 is received at the shortlister prompt generation component 910. The shortlister prompt generation component 910 processes the task processing data 737 to generate prompt data 915 representing a prompt for input to the shortlister language model 940. In some embodiments, such prompt data 915 may be generated based on combining the task processing data 737 (e.g., the user input data 127, the selected task, remaining tasks, results from processing performed to complete one or more previous tasks, etc.) and relevant API data 935 representing one or more APIs associated with the user input data 127 and/or the current task.

The relevant API data 935 may be generated by the API shortlister component 920, which may be configured to retrieve one or more (e.g., top-k) relevant APIs associated with the user input data 127 or the current task. In some embodiments, the APIs may correspond to various components. For example, the components may correspond to rule-based components, ML-based components, LLM-based components, or the like, such as personalized context component 765, skill component(s) 754, LLM agent component(s) 752, TTS component 756, orchestrator component 1130, etc.) In some embodiments, the APIs may correspond to the components.

The API shortlister component 920 may use retrieval-based approaches to retrieve the one or more relevant APIs from the index storage 930, which may store various information associated with multiple APIs such as API descriptions, API arguments (e.g., parameter inputs/outputs), identifiers for components (e.g., such as personalized context component 765, skill component(s) 754, LLM agent component(s) 752, TTS component 756) that provides the API, etc. For example, the API shortlister component 920 may compare one or more APIs included in the index storage 930 to the user input or the current task to determine one or more APIs (top-k) that corresponds to the user input or the current task (e.g., APIs that are semantically similar to the user input or the current task, APIs that are capable of performing the current task, etc.). In some embodiments, the API shortlister component 920 (or another component of the API shortlister component 920) may determine an encoded representation of the user input or the current task and compare (e.g., using cosine similarity) the encoded representation(s) to an encoded representation of an API description for the API to determine whether the API is semantically similar to the user input or the current task. An API description may correspond to a description of the one or more actions that the API is configured to perform and/or other information associated with the API (e.g., an API call formatting structure (e.g., including input parameters), historical accuracy/defect rate, historical latency value, etc.). In some embodiments, the API description may further include one or more exemplars associated with use of the API (e.g., an example user input, corresponding API call, and example API output). If the value of semantic similarity meets or exceeds a threshold, the API (and, optionally, the API description) may be included in the relevant API data 935. In some embodiments, the API shortlister component 920 may determine the relevant API data 935 further using contextual information, including the context data 805, the personalized context data 767, an accuracy/defect rate value associated with the APIs, and/or a historical latency value associated with the APIs (e.g., which may be included in the description of the API). In some embodiments, the index storage 930 may be included in the API shortlister component 920. Similar processing may be performed to determine one or more components that are semantically similar to the user input or the current task, which may be included in the relevant API data 935. The API retrieval may send the relevant API data 935 to the shortlister prompt generation component 910.

In some embodiments, the prompt data 915 may be an instruction for the shortlister language model 940 to determine one or more APIs that are to process with respect to the user input or the current task (e.g., determine one or more API calls to cause the APIs to process) given the information (e.g., the user input data 127, the context data 805, the personalized context data 767, the current task, and the relevant API data 935). As discussed above, with respect to the plan prompt generation component 810 and the task selection prompt generation component 830, in some embodiments, the shortlister prompt generation component 910 may also include in the prompt data 915 a sample processing format to be used by the shortlister language model 940 when processing the prompt. Similarly, in some embodiments, the shortlister prompt generation component 910 may generate the prompt data 915 according to a template format, such as:

```
{
You are an AI agent to find and execute an API to
    complete the task of [Task]
Here are a list of relevant API available:
[relevant API]
Use the following format:
Thought: think about what to do
API: API calls compatible with the task
Observation: the result of the API call
Summary: summarized results from the API call
If no appropriate API is found, summarize as nothing is
    found.
}
```

Following such a template format, for example, and for a selected task of "turn on all of the lights except the garage light" and corresponding relevant API data, the shortlister prompt generation component 910 may generate example prompt data 915a:

```
{
You are an AI agent to find an execute an API to complete
    the task of turn on all of the lights except the garage
    light
Here are a list of relevant API available:
Let's chat API
Classic NLU API
Smart Home skill
Use the following format:
Thought: think about what to do
API: API calls compatible with the task
Observation: the result of the API call
Summary: summarized results from the API call
If no appropriate API is found, summarize as nothing is
    found.
}
```

In some embodiments, the shortlister prompt generation component 910 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 940 processes the prompt data 915 to generate one or more API calls corresponding to request(s) that the corresponding APIs return a description of an action(s) that the APIs are configured to/will perform with respect to the user input and/or the current task. As such, in some embodiments, the shortlister language model 940 may generate API calls for a subset of the APIs represented in the prompt data 915. The shortlister language model 940 may generate the one or more APIs calls (including the required input parameters) by applying in-context learning for cold-starting APIs (e.g., one-shot/few-shot learning). For example, in embodiments where the relevant API data 935 includes the API descriptions, the shortlister language model 940 may use the one or more exemplars included in the API descriptions (included in the prompt data 915) to determine the one or more input parameters for the API call. In some embodiments, the shortlister language model 940 may be finetuned on such exemplars (e.g., during offline or runtime processing), such that the shortlister language model 940 is capable of determining the one or more input parameters for the given API call.

During processing of the shortlister language model 940 and after generating the one or more API calls, the shortlister language model 940 may cause the one or more API calls to be executed. For example, as shown in FIG. 9, the shortlister language model 940 may send action plan data 742 representing the one or more API calls to the action plan execution component 745, which causes execution of the one or more API calls included in the action plan data 742. For example, the action plan execution component 745 may process the action plan data 742 to generate action data 747a-n. Action data 747a may represent, for example, an instruction (e.g., an API call determined from the action plan data 742) for a particular API to process with respect to the user input and/or the current task. In some embodiments, the action plan execution component 745 may generate the action data 747a-n to represent an instruction to provide the description of the action performable/to be performed with respect to the user input and/or the current task.

The action plan execution component 745 may send the action data 747a-n to the API provider component 750, the LLM agent component 752, the skill component 754, the TTS component 756, and/or the orchestrator component 1130. The API provider component 750 may include one or more components (e.g., rule-based components, ML-based components, LLM-based components, or the like) that may be caused to process using the action data 747a-n (e.g., using the API calls generated by the LLM shortlister component 740).

As discussed herein above, the system 100 may include the TTS component 756, which may be configured to process textual or tokenized input to generate audio data representing synthesized speech corresponding to the textual or tokenized input spoken by a synthetic voice. The processing of the TTS component 756 is discussed in detail below with respect to FIG. 11.

The LLM agent component 752 may correspond to one or more LLM agents. An LLM agent component 752 may correspond to a custom instantiation of an LLM (and other components) that is configured to handle user inputs relating to a particular domain/functionality. In some embodiments, the LLM agent component 752 may be configured to handle specific use cases via particular prompt generation, fine-tuning of the LLM, etc. For example, the LLM agent component 752a may be configured to handle user inputs/tasks related to information query, the LLM agent component 752b may be configured handle user inputs/tasks related to shopping, the LLM agent component 752c may be configured to handle user inputs/tasks related to ordering food from various restaurants, the LLM agent component 752d may be configured to handle user inputs/tasks related to ordering food from a particular restaurant (e.g., a particular pizza restaurant), the LLM agent component 752e may be configured to handle user inputs/tasks related to booking a hotel, the LLM agent component 752f may be configured to handle user inputs/tasks related to booking a flight, etc.

The skill component 754 may be software running on the system component(s) 120 that is akin to a software application. That is, a skill component 754 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 754. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 754 may operate in conjunction between the system component(s) 120 and other devices, such as the user device 110, in order to complete certain functions. A skill component 754 may include hardware, software, firmware, or the like that may be dedicated to a particular skill component 754 or shared among different skill components 754.

As discussed above, the API provider component 750 may include various components that may be caused to execute using the action data 747a-n. For example, the API provider component 750 may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 747a-n may include an indication(s) (e.g., slots) of one or more entities included in the user input, as determined by one or more of the language models 820, 840, 940, in which case the ER component may process to link the one or more entities to the specific, referenced, entity known to the system 100.

In other embodiments, the ER component may be configured to process the action data 747a-n to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 750 may include a search component, which may be configured to query a storage (e.g., a database, repository, knowledge base, etc.) for information usable for generating a response to a user input. For example, if the action data 747a-n represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name].".

As an even further example, the API provider component 750 may include a device controller component, which may be configured to cause a device to perform an action corresponding to the action data 747a-n. For example, if the action represented by action data 747a is to turn on a living room light (e.g., "turn_on_device (device="living room light")), then the device controller component may identify the corresponding living room light, and instruct the living room light to power on (e.g., change its state to {state: ON}).

In some embodiments, the API provider component 750 may include a domain service component, which may be configured for interacting with one or more services defined by particular users, such as developers, specialists, or the like (e.g., to receive information, such as responses or annotations, to cause an action).

The API provider component 750, the LLM agent component 752, the skill component 754, and/or the TTS component 756 may send action response data 758a-n representing one or more responses generated by the one or more APIs corresponding to the action data 747a-n (e.g., the descriptions of the actions performable by the APIs with respect to the user input and/or the current task) to the action plan execution component 745. For example, in response to an API call to the skill component 754 associated with a user input for turning on a light, the action data 747a may correspond to "turn on the light," "turn_on_device ("light", [device ID])", or the like. For further example, in response to an API call to the skill component 754 associated with a user input for ordering a pizza from a particular restaurant, the action data 747b may correspond to "order medium pizza from [restaurant name]", "order_pizza ("medium", "pizza", "[restaurant name]")", or the like. The action plan execution component 745 may send the action response data 758a-n to the shortlister language model 940.

In some embodiments, the shortlister language model 940 may process the action response data 758a-n to generate a natural language summary of the action response data (e.g., the model output data 743). In some embodiments, the model output data 743 may include an association between action response data 758a (or a summarized representation of the action response data 758a) and an indication of the API/component that generated the action response data 758a (e.g., a component identifier, API description, etc.). In some embodiments, the shortlister language model 940 may be configured to filter and/or rank the action response data 797a-n based on how relevant the action response data 797a-n is to the current task. In some embodiments, the shortlister language model 940 may be configured to filter and/or rank the action response data 797a-n based on a confidence level of the component that provided the response data, where the confidence level may indicate a likelihood of the component being able to respond (e.g., within a period of time), the component being able to perform an action that corresponds to the current task, etc. In some embodiments, the action response data 797a-n may indicate whether or not the corresponding component is able to respond (e.g., the action response data 797a may include a Boolean value such as "yes" or "no" or other similar indications). In some embodiments, the shortlister language model 940 may filter and/or rank the action response data 797*a-n* based on information included in the prompt data 915 (e.g., the user input data 127, the relevant API data 935, the personalized context data 767, the prompt data 815, etc.) For example, the model output data 743 may include a subset of the response data 797*a-n* (or the summarized representations of the action response data 797*a-n*) and may further include a representation of a confidence associated with the action response data 797*a* (or a summarized representation of the response data 797*a*). As such, the model output data 743 may further include data representing a confidence of how relevant the action response data 797*a* is to the current task. In some embodiments, the shortlister language model 940 may consider a rating associated with the component that provided the action response data 797, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/provided a desired response for, etc.

The LLM shortlister component 740 may send the model output data 743 for further processing. In instances where the plan generation component 735 determined that more than one task is to be completed in order to perform the action responsive to the user input data 127, the LLM shortlister component 740 may send the model output data 743 to the plan generation component 735, which may process as described herein above to maintain and prioritize the task list based on the model output data 743 and select a new task to be completed. In instances where the plan generation component 735 determined that only one task is to be completed, or in instances where the LLM shortlister component 740 determines that there are no remaining tasks to be completed, the LLM shortlister may send the model output data 743, and the results of processing performed with respect to the previously completed tasks (e.g., previous action response data) to the response arbitration component 760, which is discussed in detail herein below with respect to FIG. 10). The LLM shortlister component 740 may further send the user input data 127, the context data 805, the personalized context data 767, etc., to the plan generation component 735 and/or the response arbitration component 760.

In some embodiments, the LLM orchestrator component 130 may further include a memory storage (not illustrated) which may store various information associated with the processing performed (e.g., user input data 127, the prompt data 815, the context data 805 the personalized context data 767, the model output data 825, prompt data 835, the task processing data 737, the relevant API data 935, the prompt data 915, the action plan data 742, the action response data 758*a-n*, the model output data 743, etc.) during one or more previous iterations of processing by the LLM orchestrator component 130 for the user input data 127. As such, after the LLM shortlister component 740 generates the model output data 743, the LLM orchestrator component 130 may send the abovementioned data to the memory storage. In some embodiments, the above mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 810 may receive one or more portions of the data included in the memory storage (which were generated during one or more previous iterations of processing performed with respect to the user input data 127) and include the one or more portions of data in the prompt data 815.

As discussed herein above, the shortlister language model 940 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 940 may send data representing a request for such additional information to the response arbitration component 760. In some embodiments, the action plan data 742 may represent the request for additional information, and the action plan execution component 745 may be configured to send corresponding action data 747 to the personalized context component 765. For example, for the example provided herein above with respect to ordering pizza, the shortlister language model 940 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 765 to "identify user pizza preference" and the personalized context component 765 may process as described herein above to return personalized context data resolving the ambiguity (e.g., the user's pizza preference may be determined to be a cheese pizza or a pepperoni pizza).

As shown in FIG. 10, the response arbitration component 760 receives the model output data 743 (output by the LLM shortlister component 740) at the response prompt generation component 1010. The response prompt generation component 1010 may further receive personalized context data 767 (from the LLM shortlister component 740 or the personalized context component 765) and context data 1042. In some embodiments, the context data 1042 may correspond to various contextual information associated with the user input (e.g., dialog history data, historical user input data, weather data, time of day, user ID, device information associated with the device that sent the user input data 127 (e.g., device ID, device states, historical device interaction data, etc.), etc.). As discussed herein below, the response arbitration component 760 may further receive additional information from the LLM shortlister component 740, such as the potential responses of processing performed with respect to previous tasks (e.g., previous action response data) associated with the user input, and the user input data 127.

The personalized context data 767 may represent one or more contextual signals associated with the user 105, such as information associated with a user profile of the user 105 (e.g., user ID, user behavioral information, user preferences, age, gender, historical user interaction data, devices associated with the user profile, etc.), which may be determined using, for example, a user recognition component 1195. In some embodiments, an indication of the user 105 and/or user profile may be included in the user input data 127 (e.g., as included in the output of the ASR component 440.). In some embodiments, the personalized context data 767 may include dialog history data representing one or more user inputs and corresponding system-generated responses for a current interaction between the user 105 and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 1010 may process the model output data 743, context data 1042, and the personalized context data 767 (and, optionally, the further information received from the LLM shortlister component 740) to generate prompt data 1015 representing a prompt for input to the response language model 1020. In some embodiments, the prompt data 1015 may be an instruction for the response language model 1020 to determine whether one or more of the potential responses represented in the model output data 743 are responsive to the user input given the other information (e.g., the personalized context data 767, the context data 1042, the potential responses associated with the previous tasks (e.g., previous action response data) associated with the user input, and the user input data 127) included in the prompt data 1015. The prompt data may further be an instruction for the response language model 1020 to, if the response language model 1020 determines that one or more of the potential responses are responsive to the user input, cause performance of the one or more corresponding actions (e.g., the one or more potential actions included in the selected responses) and/or cause the system 100 to inform the user 105 of the one or more selected responses. For example, in some embodiments, prompt data 1015 may further instruct the response language model 1020 to generate a natural language summary of the one or more selected responses determined to be responsive to the user input. The prompt data 1015 may instruct the response language model 1020 to cause the system 100 to output the natural language summary to the user 105.

In some embodiments, the prompt data 1015 may further be an instruction for the response language model 1020 to, if the response language model 1020 determines that none of the potential responses are responsive to the user input, generate a request for additional information from a component of the system 100 and/or the user 105. As discussed above, the additional information may be any information usable to determine and/or perform an action responsive to the user input (e.g., to resolve an ambiguity associated with the user input and/or a task(s) associated with the user input).

In some embodiments, the response prompt generation component 1010 may also include in the prompt data 1015 a sample processing format to be used by the response language model 1020 when processing the prompt. In some embodiments, the response prompt generation component 1010 may generate the prompt data 1015 according to a template format. For example, the prompt data 1015 may adhere to a template format including:

{

"You are a conversational AI agent that communicates with users to satisfy their request or ask clarification questions. If applicable, summarize the responses that satisfy the user's request. If applicable, call the corresponding API's to perform the potential actions that satisfy the user's request. If no response is needed, indicate that."

Here is the user's request:

[user input data 127]

Here are the potential responses:

[model output data 743]

}

In some embodiments, the template format may instruct the response language model 1020 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 1020 to generate an output representing whether one or more of the potential responses are determined to be responsive to the user input or whether additional information is needed. In some embodiments, the format may further include an indication of "Response:" instructing the response language model 1020 to indicate the one or more selected responses determined to be responsive to the user input, generate a summary of the one or more selected responses, and/or generate a request for additional information.

Following such a template format, for example, and for the example user input of "What is the weather for today" and corresponding potential responses output by the LLM shortlister component 740, the response prompt generation component 1010 may generate example prompt data 1015*a:*

{

"You are a conversational AI agent that communicates with users to satisfy their request or ask clarification questions. If no response is needed, indicate that."

Here is the user's request:

What is the weather for today

Here are the potential responses and potential actions:

Skill component A: It is currently 70 degrees, with a high of 75 and a low of 68

Skill component B: The weather for today is expected to be mostly sunny, but with a chance of rain in the late afternoon

}

For further example, and for the example user input of "please order some pizza for dinner" and corresponding potential responses output by the LLM shortlister component 740, the response prompt generation component 1010 may generate example prompt data 1015*b:*

```
{
  "You are a conversational AI agent that communicates
    with users to satisfy their request or ask clarification
    questions. If no response is needed, indicate that."
  Here is the user's request:
  Please order some pizza for dinner
  Here are the potential responses and potential actions:
  Component A: User ordered Brooklyn style pizza from
    [Company 1 name]
  API A: Use [Application 1 name] to order pizza from
    [Company 1 name]
  API B: Use [Application 2 name] to order pizza from
    [Company 2 name]
}
```

In some embodiments, the response prompt generation component 1010 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 1015 may include "Please generate a polite, respectful, and safe response and one that does not violate protected class policy."

The response language model 1020 processes the prompt data 1015 to generate model output data 1025 representing the one or more selected responses determined to be responsive to the user input, the natural language summary of the one or more selected responses, or the request for additional information.

If the response language model 1020 determines that one or more of the potential responses are responsive to the user input, the response language model 1020 may generate model output data 1025 representing the one or more selected responses, or a natural language summary of the one or more selected responses, to be output to the user. For example, based on processing the first example prompt data above, the response language model 1020 may select one of the potential responses (e.g., the potential responses from skill component A (e.g., a weather skill component)) determined to be responsive to the user input to generate model output data 1025*a:* {"It is currently 70 degrees, with a high of 75 and a low of 68," } or the like. For further example, based on processing the first example prompt data provided above, the response language model 1020 may select more than one of the potential responses (e.g., the potential responses from both the skill component A and skill component B) determined to be responsive to the user input and generate a summary of the selected responses to generate model output data 1025*b:* {"It is expected to be mostly sunny today, with a high of 75 and a low of 68, but with a chance of rain in the late afternoon,"} or the like.

As another example, based on processing the second example prompt data provided above, the response language model 1020 may select one of the potential responses (e.g., the potential response from Component A (e.g., the personalized context component 765) representing that the user order Brooklyn style pizza from [Company 1 name]) determined to be responsive to the user input to generate model output data 1025*a:* {"Ok, I will place an order for Brooklyn style pizza from [Company 1 name]," } or the like. As a further example, based on processing the second example prompt data provided above, the response language model 1020 may select more than one of the potential responses (e.g., the potential responses from both component A and API A) determined to be responsive to the user input and generate a summary of the selected responses to generate model output data 1025*b:* {"Ok, I will place an order for Brooklyn style pizza from [Company name] using [Application 1 name]," } or the like.

As such, the response language model 1020 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 1020 may cause output of the selected responses (e.g., the subset of potential responses) or a natural language summary of the selected responses to the user.

In some embodiments, the response arbitration component 760 may also generate and send an instruction to the components, (e.g., API(s), components, agents, etc. as discussed herein) configured to perform the potential actions included in the selected responses to cause performance of the potential actions (or another component of the system 100 configured to cause the components to perform the potential actions, such as the action plan execution component 745, which is discussed in more detail herein below). For example, in instances where the selected responses include a potential action to be performed, the response language model 1020 may further cause the corresponding components to perform the potential action (e.g., cause API A to order the Brooklyn style pizza from [Company 1 name] using [Application 1 name]). In other embodiments, the system 100 may not generate and/or send the instruction until approval to perform the action(s) is received from the user 105.

If the response language model 1020 determines that none of the potential responses are responsive to the user input and/or that an ambiguity exists with respect to the user input and/or one or more of the determined tasks, the response language model 1020 may generate model output data 1025 representing a request to be output to the user and/or the personalized context component 765. For example, based on processing the first example prompt data provided above, the response language model 1020 may determine an ambiguity exists with respect to the size of the pizza to be ordered and may generate model output data 1025*c:* {"What size pizza should I order?",} {"What size pizza does the user usually order?",} or the like to be output to the user and/or sent to the personalized context component 765.

As further discussed herein below, one or more of the components discussed herein (e.g., the plan generation component 735 and/or the LLM shortlister component 740) may be capable of determining whether an ambiguity exists in the user input or the current task, and may determine that additional information is needed. In response to such a determination, the component(s) may be further configured to send a request for such additional information to the response arbitration component 760, which may process as described herein to generate a request for the additional information to be sent to the personalized context component 765 or output to the user 105 to solicit the additional information. In some embodiments, the response arbitration component 760 may send the request for additional information to the action plan execution component 745, which may cause output of the request to the user 105 to solicit the additional information.

The response language model 1020 may send the model output data 1025 to the compliance component 1030, which is configured to determine whether model output data generated by the response language model 1020 is appropriate for output to the user 105. In other words, the compliance component 1030 processes the model output data 1025 to determine whether the model output data 1025 includes any inappropriate/sensitive information that should not be output to the user 105 (e.g., confidential information, offensive language, etc.). In some embodiments, the compliance component 1030 may be configured to compare the model output data 1025 to one or more words determined to be inappropriate/sensitive and should not be output to the user 105. In some embodiments, the compliance component 1030 may include/implement an ML model. For example, the ML model may process the model output data 1025 to determine whether the model output data 1025 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 1030 indicates that the model output data 1025 includes information that is not appropriate for output to the user 105, the compliance component 1030 may cause further processing of the model output data 1025 by downstream components to halt. In some embodiments, the response arbitration component 760 may cause the response language model 1020 to generate new model output data 1025 to be evaluated by the compliance component 1030. For example, the response arbitration component 760 may cause the response prompt generation component 1010 to generate new prompt data, which may include the prompt data 1015, the model output data 1025, and an indication that the model output data 1025 is not appropriate for output to the user 105. The new prompt data may be an instruction to generate new model output data that is appropriate for output to the user 105.

If the output of the compliance component 1030 indicates that the model output data 1025 is appropriate for output to the user, the compliance component 1030 may send the model output data 1025 to the output routing component 1040. The output routing component 1040 processes the model output data 1025 to determine one or more components that are to be caused to process in response to the model output data 1025. In other words, the output routing component 1040 parses the model output data 1025 to determine one or more components that the model output data 1025 is to be routed to (or that are to be caused to process based on the model output data 1025).

For example, in an instance where the response language model 1020 determines that one or more of the potential responses are responsive to the user input and generates model output data 1025 including the one or more selected responses (or a natural language summary of the one or more selected responses), the output routing component 1040 may parse the model output data 1025 to determine the selected responses/the natural language summary and send output data 1045 corresponding to the selected responses/the natural language summary to a component configured to generate corresponding data to be output to the user 105. For example, the output routing component 1040 may send the output data 1045 to a TTS component (e.g., the TTS component 756), which may process as described herein below to generate output audio data including synthesized speech corresponding to the output data 1045, which the system 100 may send to the user device 110 for output to the user 105. In some embodiments, the system 100 may further include a component configured to generate visual output data (e.g., output image and/or video data) corresponding to the output data 1045, which may be sent to the user device 110 to be output to the user.

For further example, in embodiments where the model output data 1025 includes selected responses that include one or more potential actions to be performed, the output routing component 1040 may process as described herein above to determine the one or more selected responses/the natural language summary and send the output data 1045 to the one or more components associated with the selected responses. In such embodiments, the output data 1045 may further include an instruction for the one or more components to perform the potential actions corresponding to the selected responses. For example, in some embodiments, the components corresponding to the potential responses included in the model output data 743 may, after generating the potential responses, suspend processing required to perform the potential action included in the potential responses and await an instruction from the system 100 to perform the potential action. As such, the output routing component 1040 may include the instruction in the output data 1045 to cause the component to perform the potential action. In some embodiments, the output routing component 1040 may generate an API call configured to cause the component to perform the action.

In some embodiments, where the model output data 1025 includes selected responses that include one or more potential actions to be performed, the output data 1045 may further request authorization from the user 105 to perform the one or more potential actions responsive to the user input. After receiving the request authorization (e.g., via a subsequent user input) the response arbitration component 760 may generate and send the corresponding instruction (or API call) to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 760 may use such data as authorization to perform the one or more potential actions. For example, the user 105 may have previously provided authorization for a set of actions (e.g., turning on outside lights). Thereafter, the system 100 may determine the one or more potential actions to be performed in response to the user input data 127. If the system 100 determines that the one or more actions are included in the set of actions previously authorized by the user 105, the system 100 may not ask for further authorization prior to causing the one or more potential actions to be performed.

For further example, in an instance where the response language model 1020 generates model output data 1025 including a request for additional information (in response to the response language model 1020 determining that none of the potential responses are responsive to the user input and/or an ambiguity exists with respect to the user input and/or one or more of the tasks), which may be determined by the output routing component 1040 based on, for example, the model output data 1025 including a question, the output routing component 1040 may parse the model output data 1025 to determine whether the request for additional information is to be sent to the personalized context component 765 and/or output to the user 105. In some embodiments, the response language model 1020 may include in the model output data 1025 an indication of whether the request for additional information should be sent to the personalized context component 765 and/or output to the user 105. In some embodiments, unless otherwise indicated in the model output data 1025, the output routing component 1040 may determine to send the request for additional information to the personalized context component 765 prior to outputting the request for additional information to the user 105. In the instance where the personalized context component 765 is unable to resolve the ambiguity (or a component of the system 100 is unable to resolve the ambiguity using the personalized context data generated by the personalized context component 765), the output routing component 1040 may determine the request for additional information is to be output to the user 105.

The output data 1045 may be sent to the personalized context component 765. As discussed above, the output data 1045 may be sent to the personalized context component 765 based on the model output data 1025 including a request for additional information and the output routing component 1040 determining the request for additional information is to be sent to the personalized context component 765. The personalized context component 765 may process to generate personalized context data associated with the output data 1045 (e.g., the request for additional information). The personalized context data may then be sent to another component of the system 100, such as the plan generation component 735, the LLM shortlister component 740, and/or the response arbitration component 760, which may process as discussed herein above.

The personalized context component 765 may be configured to determine and return contextual information associated with a user input. In some embodiments, the personalized context component 765 may query various components and/or storages (e.g., the profile storage 1170) for the contextual information. In some embodiments, the personalized context component 765 may include a storage including one or more portions of the contextual information. In other embodiments, the personalized context component 765 may be/implement an LLM. In such embodiments, the personalized context component 765 may be finetuned on personalized information for one or more users, as is discussed in more detail herein below. Further, in such embodiments, the personalized context component 765 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 767) associated with the prompt.

The output data 1045 may be sent to the one or more of the TTS component 756, the skill component 754, the LLM agent component 752, and/or the API provider component 750 (e.g., a device controller component).

The TTS component 756 may be configured to process textual or tokenized input to generate audio data representing synthesized speech corresponding to the textual or tokenized input spoken by a synthetic voice. The processing of the TTS component 756 is discussed in detail below with respect to FIG. 11.

The skill component 754 may be software running on the system component(s) 120 that is akin to a software application. That is, a skill component 754 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 754. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 754 may operate in conjunction between the system component(s) 120 and other devices, such as the user device 110, in order to complete certain functions. A skill component 754 may include hardware, software, firmware, or the like that may be dedicated to a particular skill component 754 or shared among different skill components 754.

The LLM agent component 752 may correspond to one or more LLM agents. An LLM agent component 752 may correspond to a custom instantiation of an LLM (and other components) that is configured to handle user inputs relating to a particular domain/functionality. In some embodiments, the LLM agent component 752 may be configured to handle specific use cases via particular prompt generation, fine-tuning of the LLM, etc. For example, the LLM agent component 752*a* may be configured to handle user inputs/tasks related to information query, the LLM agent component 752*b* may be configured handle user inputs/tasks related to shopping, the LLM agent component 752*c* may be configured to handle user inputs/tasks related to ordering food from various restaurants, the LLM agent component 752*d* may be configured to handle user inputs/tasks related to ordering food from a particular restaurant (e.g., a particular pizza restaurant), the LLM agent component 752*e* may be configured to handle user inputs/tasks related to booking a hotel, the LLM agent component 752*f* may be configured to handle user inputs/tasks related to booking a flight, etc.

For example, the TTS component 756 may process as discussed herein above to generate output audio data corresponding to the output data 1045 (e.g., output audio data corresponding to the one or more actions/natural language summary responsive to the user input, the request for additional information, etc.). Thereafter, the system 100 may send the output audio data to the device 110 for output to the user 105. For further example, the LLM agent component 752 may process as discussed herein above to cause the corresponding one or more actions corresponding to the output data 1045 to be performed. As another example, a device controller component of the API provider component 750 may cause a device to perform an action corresponding to the output data 1045. For example, if the action represented by output data 1045 is to turn on a living room light (e.g., "turn_on_device (device="living room light")), then the device controller component may identify the corresponding living room light, and instruct the living room light to power on (e.g., change its state to {state: ON}).

In some embodiments, the output data 1045 may be sent to the action plan execution component 745, which may send the output data 1045 to the corresponding component/API (e.g., the TTS component 756, the skill component 754, the LLM agent component 752, the API provider component 750, etc.).

In some embodiments, the response arbitration component 760 may be configured to further process data representing a potential responses potentially responsive to the user input that is generated by one or more other components of the system 100 not included in the LLM orchestrator component 130. For example, the response arbitration component 760 may further receive data from an orchestrator component 1130 (discussed in detail herein below with respect to FIG. 11) representing a potential response to the user input (e.g., the output of the skill component 754), where the orchestration of the processing performed to generate the potential response was performed by the orchestrator component 1130, rather than the LLM orchestrator component 130. In such embodiments, the response arbitration component 760 may be further configured to arbitrate between first potential responses received as a result of the processing of the LLM orchestrator component 130 and second potential responses received as a result of the processing of the orchestrator component 1130. As discussed above, the response arbitration component 760 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 1130 may be included in the model output data 743. For example, the orchestrator component 1130 may be determined to be configured to perform a function (e.g., cause another component(s) to perform a function) potentially relevant to the user input such that the LLM shortlister component 740 may cause the orchestrator component 1130 to generate potential responses potentially responsive to the user input, which may be included in the model output data 743 sent to the response arbitration component 760. Further details regarding the processing of the LLM shortlister component 740 to generate the model output data 743 are discussed herein below with respect to FIG. 9.

As discussed above, the response arbitration component may include a self-learning component 1050. The self-learning component 1050 may be configured to collect, store, and distribute various feedback associated with the processing of the one or more components, discussed herein above, with respect to a user input. The self-learning component 1050 may use the feedback to cause the one or more components to be updated/trained based on the various feedback. In some embodiments, the self-learning component 1050 may be located elsewhere in the system 100, outside of the response arbitration component 760.

For example, the self-learning component 1050 may collect and store various information (e.g., feedback signal 1055a-n) associated with processing with respect to a user input, such as a determined task(s) associated with performance of an action responsive to the user input, a selected task, a prioritization of tasks, a selected API(s), an API-generated potential response(s), interaction history data, dialog history data, or any other data generated during the processing discussed herein below with respect to FIGS.

8-9. The self-learning component 1050 may further collect information (e.g., feedback signal 1055a-n) associated with a user satisfaction with the processing of the system 100. The self-learning component 1050 may determine such user satisfaction information based on implicit and explicit feedback signals (e.g., feedback signal 1055a-n). For example, an explicit feedback signal 1055a may be a follow-up user input associated with the response generated by the system 100 (e.g., "Add milk, please."), the response arbitration component 760 receiving varying results from processing performed by the orchestrator component 1130 and the LLM orchestrator component 130 (e.g., a first potential response from the orchestrator component 1130 including a potential action of "add milk to your grocery list" and a second potential response from the LLM orchestrator component 130 including a request for additional information of "can you specify the list?"), a request for additional information output to the user and the user's corresponding response, a system-determined quality of a generated request for additional information, etc.

For further example, an implicit feedback signal 1055b may be a follow-up user input associated with the response generated by the system 100 (e.g., "Add milk, please."), the response arbitration component 760 receiving varying results from processing performed by the orchestrator component 1130 and the LLM orchestrator component 130 (e.g., a first potential response from the orchestrator component 1130 including a potential action of "add milk to your grocery list" and a second potential response from the LLM orchestrator component 130 including a potential action of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., feedback signal 1055a-n) collected by the self-learning component 1050 may be used to update/train one or more components of the arbitration component. For example, if a user previously provided a follow-up user input requesting that future outputs be kept to a minimal amount of words, the self-learning component 1050 may receive the follow-up user input as an explicit feedback signal 1055a and may use the explicit feedback signal 1055a to update the response prompt generation component 1010. As shown in FIG. 10, the self-learning component 1050 may generate self-learning data 1060a/1060b representing training data including the explicit feedback signal 1055a and send the self-learning data 1060a to the response prompt generation component 1010 and/or send the self-learning data 1060b to the response language model 1020. The response prompt generation component 1010 may be updated/trained based on the self-learning data 1060a such that, for a user input associated with the user that provided the follow-up user input, the response prompt generation component 1010 may include in the prompt data an indication that the response language model 1020 should generate a short and concise response to the user. The response language model 1020 may be updated/trained based on the self-learning data 1060b such that the response language model 1020 is better configured for generating short and concise responses. In some embodiments, the various data (e.g., feedback signal 1055*a-n*) collected by the self-learning component 1050 may be used by the system 100 to update/train one or more components of the system 100. In such embodiments, the self-learning component 1050 may send the self-learning data 1060*c* to another component of the system 100 to update/train the component. For further example, if a user previously provided a follow-up user input of "Add milk, please," in response to a system-generated response to a user input of "Add eggs to my list", the self-learning component 1050 may receive the follow-up user input as an explicit feedback signal 1055*b* and may use the explicit feedback signal 1055*b* to update a user profile associated with the user (e.g., represented in the profile storage 1170) and/or update a storage/index of the personalized context component 765. The self-learning component 1050 may generate self-learning data 1060*c* representing training data including the explicit feedback signal 1055*b* and send the self-learning data 1060*c* to the profile storage 1170 and/or the personalized context component 765. For example, the personalized context component 765 may be updated/trained based on the self-learning data 1060*c* such that processing of a similar future input of "Add eggs to my list" may result in the personalized context component 765 generating personalized context data representing that the user has previously also added milk to their list. The system 100 may use this personalized context data to generate a response of "Would you also like me to add milk to your list?".

In some embodiments, the language models 820, 840, 940, 1020 may be fine-tuned to perform a particular task(s). Fine-tuning of the language models 820, 840, 940, 1020 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the plan generation language model 820, the task selection language model 840, and/or the shortlister language model 940 indicates that additional information is needed to complete a first task associated with a user input, a request for the additional information may be sent to the personalized context component 765. Thereafter, the plan generation language model 820, the task selection language model 840, and/or the shortlister language model 940 may continue to process to complete their configured operations. For example, while the personalized context component 765 is processing to determine the additional information, the system 100 may begin processing with respect to a second task associated with the user input. Thereafter, the output of the personalized context component 765 may be sent to the response arbitration component 760 such that once the response arbitration component 760 receives the output of the LLM shortlister component 740, the response arbitration component 760 may resolve the ambiguity that resulted in the request for additional information in order to generate the output data 762. For further example, if the user input data 127 is generated to include the natural language representation of the user input, but the processing required to determine the corresponding contextual signals (e.g., weather data, time of data, dialog history, device information, etc.) is yet to be completed, the plan generation component 735 may begin processing with respect to the natural language representation of the user input. Once the corresponding contextual signals have been generated, the plan generation component 735 may begin processing with respect to the contextual signals and may update downstream components with the result of the processing with respect to the contextual signals.

As another example, if the API shortlister component 920 determines (e.g., with a confidence value that meets or exceeds a particular threshold) that a particular API or API description should be included in the relevant API data, the API shortlister component 920 may provide the corresponding relevant API data to the shortlister prompt generation component 910 so that the shortlister prompt generation component 910 may begin processing with respect to the relevant API data while the API shortlister component 920 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

In some embodiments, one or more of the components discussed herein above may be updated/trained based on various feedback associated with the processing of the one or more components with respect to a user input. For example, the system 100 may include a component that collects and stores various information determined during processing with respect to a user input (e.g., a determined task, a selected task, a prioritization of tasks, a selected API, a generated response, interaction history, dialog history, etc.). The component may further collect information associated with a user satisfaction with the processing of the system 100. The component may determine such user satisfaction information based on implicit and explicit feedback signals. For example, an explicit feedback signal may be a follow-up user input associated with the response generated by the system 100 (e.g., "Add milk, please."), the response arbitration component 760 receiving varying responses from processing performed by the orchestrator component 1130 and the LLM orchestrator component 130 (e.g., a first response from the orchestrator component 1130 of "add milk to your grocery list" and a second response from the LLM orchestrator component 130 of "can you specify the list?"), a request for additional information output to the user and the user's corresponding response, a system-determined quality of a generated request for clarifying information, etc.

For further example, an implicit feedback signal may be a follow-up user input associated with the response generated by the system 100 (e.g., "Add milk, please."), the response arbitration component 760 receiving varying responses from processing performed by the orchestrator component 1130 and the LLM orchestrator component 130 (e.g., a first response from the orchestrator component 1130 of "add milk to your grocery list" and a second response from the LLM orchestrator component 130 of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., the feedback signals) collected by the component may be used by the system 100 to update/ train one or more components of the system 100. For example, if a user previously provided a follow-up user input of "Add milk, please," in response to a system-generated response to a user input of "Add eggs to my list", the system 100 may use the explicit feedback signal to update one or more components of the system 100 such that processing of a similar future input of "Add eggs to my list" may result in generation of a response of "Would you also like me to add milk to your list?"

Figure 11:
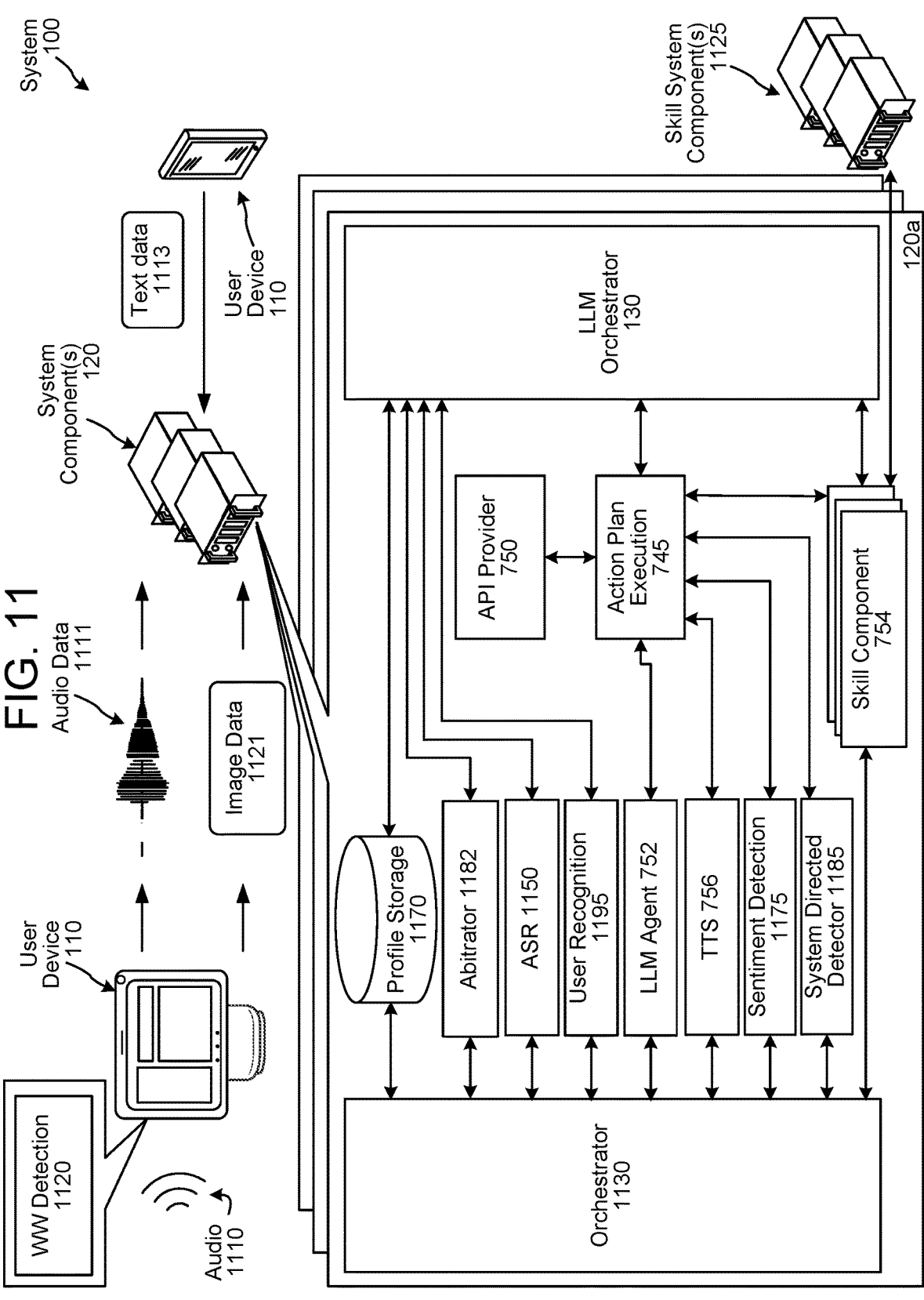
FIG. 11 is a conceptual diagram of components of the system, according to embodiments of the present disclosure.

The system 100 may operate using various components as described in FIG. 11. The various components may be located on same or different physical devices. Communication between various components may occur directly or across a network(s) 199. The user device 110 may include audio capture component(s), such as a microphone or array of microphones of a user device 110, captures audio 1111 and creates corresponding audio data. Once speech is detected in audio data representing the audio 1111, the user device 110 may determine if the speech is directed at the user device 110/system component(s). In at least some embodiments, such determination may be made using a wakeword detection component 1120. The wakeword detection component 1120 may be configured to detect various wakewords. In at least some examples, each wakeword may correspond to a name of a different digital assistant. An example wakeword/digital assistant name is "Alexa." In another example, input to the system may be in form of text data 1113, for example as a result of a user typing an input into a user interface of user device 110. Other input forms may include indication that the user has pressed a physical or virtual button on user device 110, the user has made a gesture, etc. The user device 110 may also capture images using camera(s) 1318 of the user device 110 and may send image data 1121 representing those image(s) to the system component(s). The image data 1121 may include raw image data or image data processed by the user device 110 before sending to the system component(s). The image data 1121 may be used in various manners by different components of the system to perform operations such as determining whether a user is directing an utterance to the system, interpreting a user command, responding to a user command, etc.

The wakeword detection component 1120 of the user device 110 may process the audio data, representing the audio 1111, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 1111, is analyzed to determine if specific characteristics of the audio data match preconfigured acoustic waveforms, audio signatures, or other data corresponding to a wakeword.

Thus, the wakeword detection component 1120 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1120 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 1120 and/or input is detected by an input detector, the user device 110 may "wake" and begin transmitting audio data 1111, representing the audio 1111, to the system component(s) 120. The audio data 1111 may include data corresponding to the wakeword; in other embodiments, the portion of the audio corresponding to the wakeword is removed by the user device 110 prior to sending the audio data 1111 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 1120 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 754 of one or more system component(s) 120.

The user device 110 may also include a system directed input detector 1285. (The system component(s) may also include a system directed input detector 1185 which may operate in a manner similar to system directed input detector 1285.) The system directed input detector 1285 may be configured to determine whether an input to the system (for example speech, a gesture, etc.) is directed to the system or not directed to the system (for example directed to another user, etc.). The system directed input detector 1285 may work in conjunction with the wakeword detection component 1120. If the system directed input detector 1285 determines an input is directed to the system, the user device 110 may "wake" and begin sending captured data for further processing (for example, processing audio data using the language processing 1192/1292, processing captured image data using image processing component 1140/1240 or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1285 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 1285 is determining whether an input is potentially device directed. For example, the system may output an orange indicator while considering an input, and may output a green indicator if a system directed input is detected. Other such configurations are possible.

Upon receipt by the system component(s) 120, the audio data 1111 may be sent to an orchestrator component 1130 and/or the LLM orchestrator component 130. The orchestrator component 1130 may include memory and logic that enables the orchestrator component 1130 to transmit various pieces and forms of data to various components of the system, as well as perform other operations as described herein. In some embodiments, the orchestrator component 1130 may optionally be included in the system component(s) 120. In embodiments where the orchestrator component 1130 is not included in the system component(s) 120, the audio data 1111 may be sent directly to the LLM orchestrator component 130. Further, in such embodiments, each of the components of the system component(s) 120 may be configured to interact with the LLM orchestrator component 130, the action plan execution component 745, and/or the API provider component 750.

In some embodiments, the system component(s) 120 may include an arbitrator component 1182, which may be configured to determine whether the orchestrator component 1130 and/or the LLM orchestrator component 130 are to process with respect to the audio data 1111. In some embodiments, the LLM orchestrator component 130 may be selected to process with respect to the audio data 1111 only if the user 105 associated with the audio data 1111 (or the user device 110 that captured the audio 1110) has previously indicated that the LLM orchestrator component 130 may be selected to process with respect to user inputs received from the user 105.

In some embodiments, the arbitrator component 1182 may determine the orchestrator component 1130 and/or the LLM orchestrator component 130 are to process with respect to the audio data 1111 based on metadata associated with the audio data 1111. For example, the arbitrator component 1182 may be a classifier configured to process a natural language representation of the audio data 1111 (e.g., output by the ASR component 1150) and classify the corresponding user input as requiring the processing of the orchestrator component 1130 and/or the LLM orchestrator component 130. For further example, the arbitrator component 1182 may determine whether the device from which the audio data 1111 is received is associated with an indicator representing the audio data 1111 is to be processed by the orchestrator component 1130 and/or the LLM orchestrator component 130. As an even further example, the arbitrator component 1182 may determine whether the user (e.g., determined using data output from the user recognition component 1195) from which the audio data 1111 is received is associated with a user profile including an indicator representing the audio data 1111 is to be processed by the orchestrator component 1130 and/or the LLM orchestrator component 130. As another example, the arbitrator component 1182 may determine whether the audio data 1111 (or the output of the ASR component 1150) corresponds to a request representing that the audio data 1111 is to be processed by the orchestrator component 1130 and/or the LLM orchestrator component 130 (e.g., a request including "let's chat" may represent that the audio data 1111 is to be processed by the LLM orchestrator component 130). In some embodiments, if the arbitrator component 1182 is unsure (e.g., a confidence score corresponding to whether the orchestrator component 1130 and/or the LLM orchestrator component 130 is to process is below a threshold), then the arbitrator component 1182 may send the audio data 1111 to both of the orchestrator component 1130 and the LLM orchestrator component 130. In such embodiments, the orchestrator component 1130 and/or the LLM orchestrator component 130 may include further logic for determining further confidence scores during processing representing whether the orchestrator component 1130 and/or the LLM orchestrator component 130 should continue processing.

The arbitrator component 1182 may send the audio data 1111 to an ASR component 1150. In some embodiments, the component selected to process the audio data 1111 (e.g., the orchestrator component 1130 and/or the LLM orchestrator component 130) may send the audio data 1111 to the ASR component 1150. The ASR component 1150 may transcribe the audio data 1111 into text data. The text data output by the ASR component 1150 represents one or more than one (e.g., in the form of an N-best list) ASR hypotheses representing speech represented in the audio data 1111. The ASR component 1150 interprets the speech in the audio data 1111 based on a similarity between the audio data 1111 and pre-established language models. For example, the ASR component 1150 may compare the audio data 1111 with models for sounds (e.g., acoustic units such as phonemes, senons, phones, etc.) and sequences of sounds to identify words that match the sequence of sounds of the speech represented in the audio data 1111. The ASR component 1150 sends the text data generated thereby to the arbitrator component 1182, the orchestrator component 1130, and/or the LLM orchestrator component 130. In instances where the text data is sent to the arbitrator component 1182, the arbitrator component 1182 may send the text data to the component selected to process the audio data 1111 (e.g., the orchestrator component 1130 and/or the LLM orchestrator component 130). The text data sent from the ASR component 1150 to the arbitrator component 1182, the orchestrator component 1130, and/or the LLM orchestrator component 130 may include a single top-scoring ASR hypothesis or may include an N-best list including multiple top-scoring ASR hypotheses. An N-best list may additionally include a respective score associated with each ASR hypothesis represented therein.

As discussed herein above, in some embodiments, the LLM shortlister component 740 (e.g., via the API shortlister component 920 and/or the shortlister language model 940) may be configured to select the orchestrator component 1130 to process with respect to the user input and/or a current task to return action response data (e.g., the action response data 797a) representing a response to the user input/current task or a description of an action the orchestrator component 1130 may cause to be performed in response to the user input/current task. As such, in some embodiments, although the LLM orchestrator component 130 is determined to process with respect to a user input, the LLM orchestrator component 130 may determine, during such processing, that the orchestrator component 1130 should process with respect to the user input.

A skill system component(s) 1125 may communicate with a skill component(s) 754 within the system component(s) 120 directly with the orchestrator component 1130 and/or the action plan execution component 745, or with other components. A skill system component(s) 1125 may be configured to perform one or more actions. An ability to perform such action(s) may sometimes be referred to as a "skill." That is, a skill may enable a skill system component(s) 1125 to execute specific functionality in order to provide data or perform some other action requested by a user. For example, a weather service skill may enable a skill system component(s) 1125 to provide weather information to the system component(s) 120, a car service skill may enable a skill system component(s) 1125 to book a trip with respect to a taxi or ride sharing service, an order pizza skill may enable a skill system component(s) 1125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 754 dedicated to interacting with the skill system component(s) 1125. Unless expressly stated otherwise, reference to a skill, skill device, or skill component may include a skill component 754 operated by the system component(s) 120 and/or skill operated by the skill system component(s) 1125. Moreover, the functionality described herein as a skill or skill may be referred to using many different terms, such as an action, bot, app, or the like. The skill component 754 and or skill system component(s) 1125 may return output data to the orchestrator component 1130.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 756. The TTS component 756 may generate audio data (e.g., synthesized speech) from text data using one or more different methods. Text data input to the TTS component 756 may come from a skill component 754, the orchestrator component 1130, or another component of the system. In one method of synthesis called unit selection, the TTS component 756 matches text data against a database of recorded speech. The TTS component 756 selects matching units of recorded speech and concatenates the units together to form audio data. In another method of synthesis called parametric synthesis, the TTS component 756 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 1111 representing the commands to the system component(s) 120 for processing, after which the system component(s) 120 may return output data that can cause the user device 110 to engage its camera.

The system component(s) 120 may include a user recognition component 1195 that recognizes one or more users using a variety of data. However, the disclosure is not limited thereto, and the user device 110 may include a user recognition component 1295 instead of and/or in addition to user recognition component 1195 of the system component(s) 120 without departing from the disclosure. User recognition component 1295 operates similarly to user recognition component 1195.

The user recognition component 1195 may take as input the audio data 1111 and/or text data output by the ASR component 1150. The user recognition component 1195 may perform user recognition by comparing audio characteristics in the audio data 1111 to stored audio characteristics of users. The user recognition component 1195 may also perform user recognition by comparing biometric data (e.g., fingerprint data, iris data, etc.), received by the system in correlation with the present user input, to stored biometric data of users assuming user permission and previous authorization. The user recognition component 1195 may further perform user recognition by comparing image data (e.g., including a representation of at least a feature of a user), received by the system in correlation with the present user input, with stored image data including representations of features of different users. The user recognition component 1195 may perform additional user recognition processes, including those known in the art.

The user recognition component 1195 determines scores indicating whether user input originated from a particular user. For example, a first score may indicate a likelihood that the user input originated from a first user, a second score may indicate a likelihood that the user input originated from a second user, etc. The user recognition component 1195 also determines an overall confidence regarding the accuracy of user recognition operations.

Output of the user recognition component 1195 may include a single user identifier corresponding to the most likely user that originated the user input. Alternatively, output of the user recognition component 1195 may include an N-best list of user identifiers with respective scores indicating likelihoods of respective users originating the user input. The output of the user recognition component 1195 may be used to inform processing of the arbitrator component 1182, the orchestrator component 1130, and/or the LLM orchestrator component 130 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1170 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 1170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1170 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 1175 that may be configured to detect a sentiment of a user from audio data representing speech/utterances from the user, image data representing an image of the user, and/or the like. The sentiment detection component 1175 may be included in system component(s) 120, as illustrated in FIG. 11, although the disclosure is not limited thereto and the sentiment detection component 1175 may be included in other components without departing from the disclosure. For example the sentiment detection component 1275 may be included in the user device 110, as a separate component, etc. Sentiment detection component 1275 may operate similarly to sentiment detection component 1175. The system component(s) may use the sentiment detection component 1175 to, for example, customize a response for a user based on an indication that the user is happy or frustrated.

Figure 12:
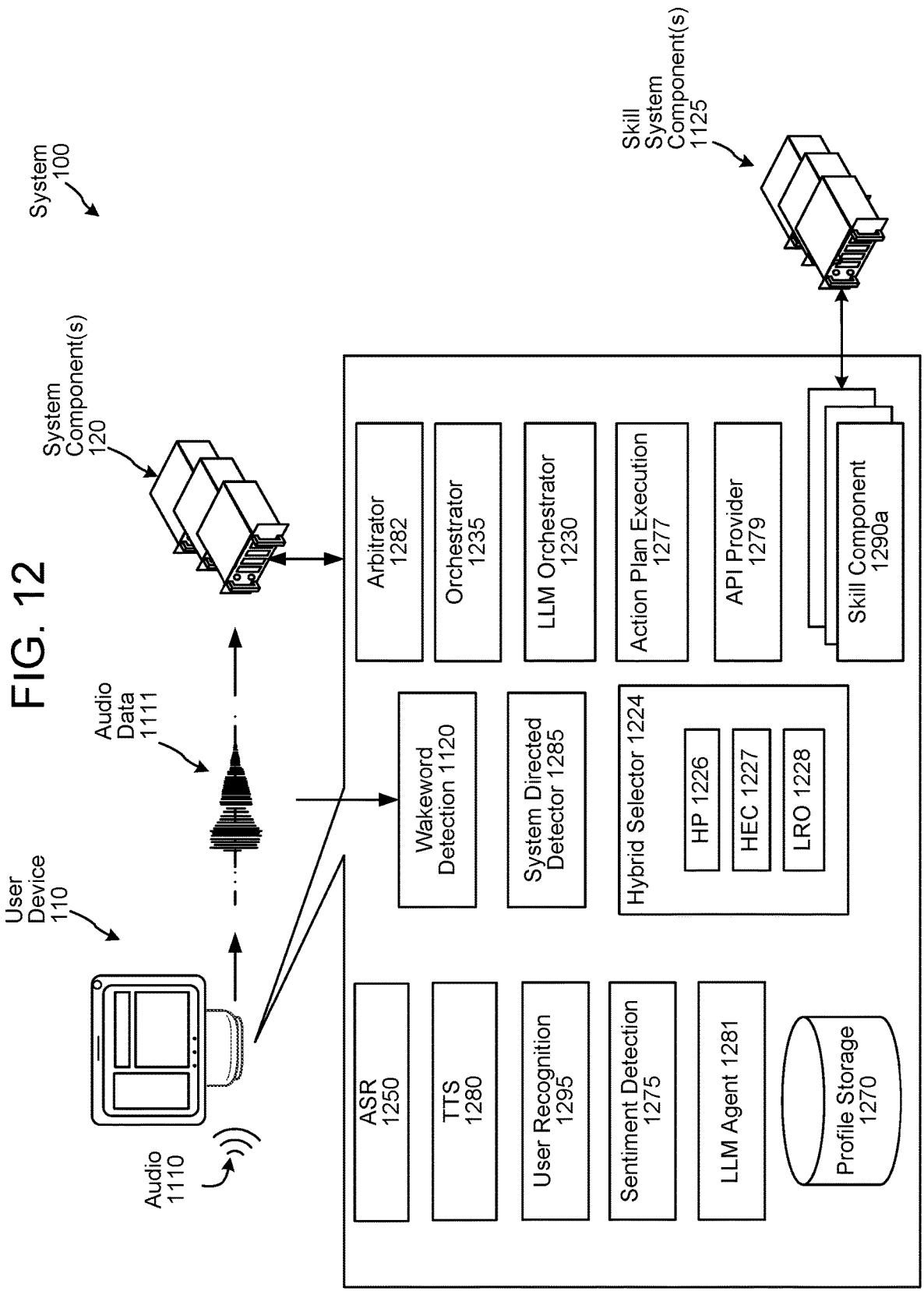
FIG. 12 is a conceptual diagram illustrating components that may be included in a device, according to embodiments of the present disclosure.

Although the components of FIG. 11 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 12 illustrates such a configured user device 110.

In at least some embodiments, the system component(s) may receive the audio data 1111 from the user device 110, to recognize speech corresponding to a spoken input in the received audio data 1111, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in a response data (e.g., a remote response), may instruct the user device 110 to output an audible response (e.g., using TTS processing performed by an on-device TTS component 1280) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 11, the user device 110 may include a wakeword detection component 1120 configured to compare the audio data 1111 to stored models used to detect a wakeword (e.g., "Alexa") that indicates to the user device 110 that the audio data 1111 is to be processed by the user device 110 (e.g., by the orchestrator component 1235 and/or the LLM orchestrator 1230, which are configured similar to the orchestrator component 1130 and the LLM orchestrator component 130, respectively). In at least some embodiments, a hybrid selector 1224, of the user device 110, may send the audio data 1111 to the wakeword detection component 1120. If the wakeword detection component 1120 detects a wakeword in the audio data 1111, the wakeword detection component 1120 may send an indication of such detection to the hybrid selector 1224. In response to receiving the indication, the hybrid selector 1224 may send the audio data 1111 to the system component(s) and/or the ASR component 1250. The wakeword detection component 1120 may also send an indication, to the hybrid selector 1224, representing a wakeword was not detected. In response to receiving such an indication, the hybrid selector 1224 may refrain from sending the audio data 1111 to the system component(s), and may prevent the ASR component 1250 from further processing the audio data 1111. In this situation, the audio data 1111 can be discarded.

The user device 110 may conduct its own speech processing using on-device processing components, such as an ASR component 1250, similar to the manner discussed herein with respect to the ASR component 1150 of the system component(s) 120. The user device 110 may also internally include, or otherwise have access to, other components such as one or more skill components 1290 capable of executing commands based on the output of the orchestrator component 1235, the LLM orchestrator 1230, or other results determined by the user device 110/system component(s) (which may operate similarly to skill components 754), an arbitrator component 1282 (configured to process in a similar manner to that discussed herein above with respect to the arbitrator component 1182), an action plan execution component 1277 (configured to process in a similar manner to that discussed herein with respect to the action plan execution component 745), an API provider component 1279 (configured to process in a similar manner to that discussed herein with respect to the API provider component 750), and LLM agent component 1281 (configured to process in a similar manner to that discussed herein with respect to the LLM agent component 752), a user recognition component 1295 (configured to process in a similar manner to that discussed herein with respect to the user recognition component 1195 of the system component(s)), profile storage 1270 (configured to store similar profile data to that discussed herein with respect to the profile storage 1170 of the system component(s)), or other components. In at least some embodiments, the profile storage 1270 may only store profile data for a user or group of users specifically associated with the user device 110. Similar to as described above with respect to skill component 754, a skill component 1290 may communicate with a skill system component(s) 1125. The user device 110 may also have its own TTS component 1280, which may operate similarly to TTS component 756.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 1224, of the user device 110, may include a hybrid proxy (HP) 1226 configured to proxy traffic to/from the system component(s). For example, the HP 1226 may be configured to send messages to/from a hybrid execution controller (HEC) 1227 of the hybrid selector 1224. For example, command/directive data received from the system component(s) can be sent to the HEC 1227 using the HP 1226. The HP 1226 may also be configured to allow the audio data 1111 to pass to the system component(s) while also receiving (e.g., intercepting) this audio data 1111 and sending the audio data 1111 to the HEC 1227.

In at least some embodiments, the hybrid selector 1224 may further include a local request orchestrator (LRO) 1228 configured to notify the ASR component 1250 about the availability of new audio data 1111 that represents user speech, and to otherwise initiate the operations of local language processing when new audio data 1111 becomes available. In general, the hybrid selector 1224 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 1111 is received, the HP 1226 may allow the audio data 1111 to pass through to the system component(s) and the HP 1226 may also input the audio data 1111 to the on-device ASR component 1250 by routing the audio data 1111 through the HEC 1227 of the hybrid selector 1224, whereby the LRO 1228 notifies the ASR component 1250 of the audio data 1111. At this point, the hybrid selector 1224 may wait for response data from either or both of the system component(s) or the local language processing components. However, the disclosure is not limited thereto, and in some examples the hybrid selector 1224 may send the audio data 1111 only to the local ASR component 1250 without departing from the disclosure. For example, the user device 110 may process the audio data 1111 locally without sending the audio data 1111 to the system component(s).

The local ASR component 1250 is configured to receive the audio data 1111 from the hybrid selector 1224, and to recognize speech in the audio data 1111. The user device 110 and/or the system component(s) may associate a unique identifier with each natural language user input. The user device 110 may include the unique identifier when sending the audio data 1111 to the system component(s), and the response data from the system component(s) may include the unique identifier to identify which natural language user input the response data corresponds.

In at least some embodiments, the user device 110 may include, or be configured to use, one or more skill components 1290 that may work similarly to the skill component(s) 754 implemented by the system component(s). The skill component(s) 1290 may correspond to one or more domains that are used in order to determine how to act on a spoken input in a particular way, such as by outputting a directive that corresponds to the determined intent, and which can be processed to implement the desired operation. The skill component(s) 1290 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 1125. For example, a skill system component(s) 1125 may be located in a remote environment (e.g., separate location) such that the user device 110 may only communicate with the skill system component(s) 1125 via the network(s) 199. However, the disclosure is not limited thereto. For example, in at least some embodiments, a skill system component(s) 1125 may be configured in a local environment (e.g., home server and/or the like) such that the user device 110 may communicate with the skill system component(s) 1125 via a private network, such as a local area network (LAN).

As used herein, a "skill" may refer to a skill component 1290, a skill system component(s) 1125, or a combination of a skill component 1290 and a corresponding skill system component(s) 1125.

Similar to the manner discussed with regard to FIG. 11, the local user device 110 may be configured to recognize multiple different wakewords and/or perform different categories of tasks depending on the wakeword. Such different wakewords may invoke different processing components of local user device 110 (not illustrated in FIG. 12). For example, detection of the wakeword "Alexa" by the wakeword detection component 1120 may result in sending audio data to certain language processing components 1292/skill components 1290 for processing while detection of the wakeword "Computer" by the wakeword detector may result in sending audio data different language processing components 1292/skill components 1290 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 13:
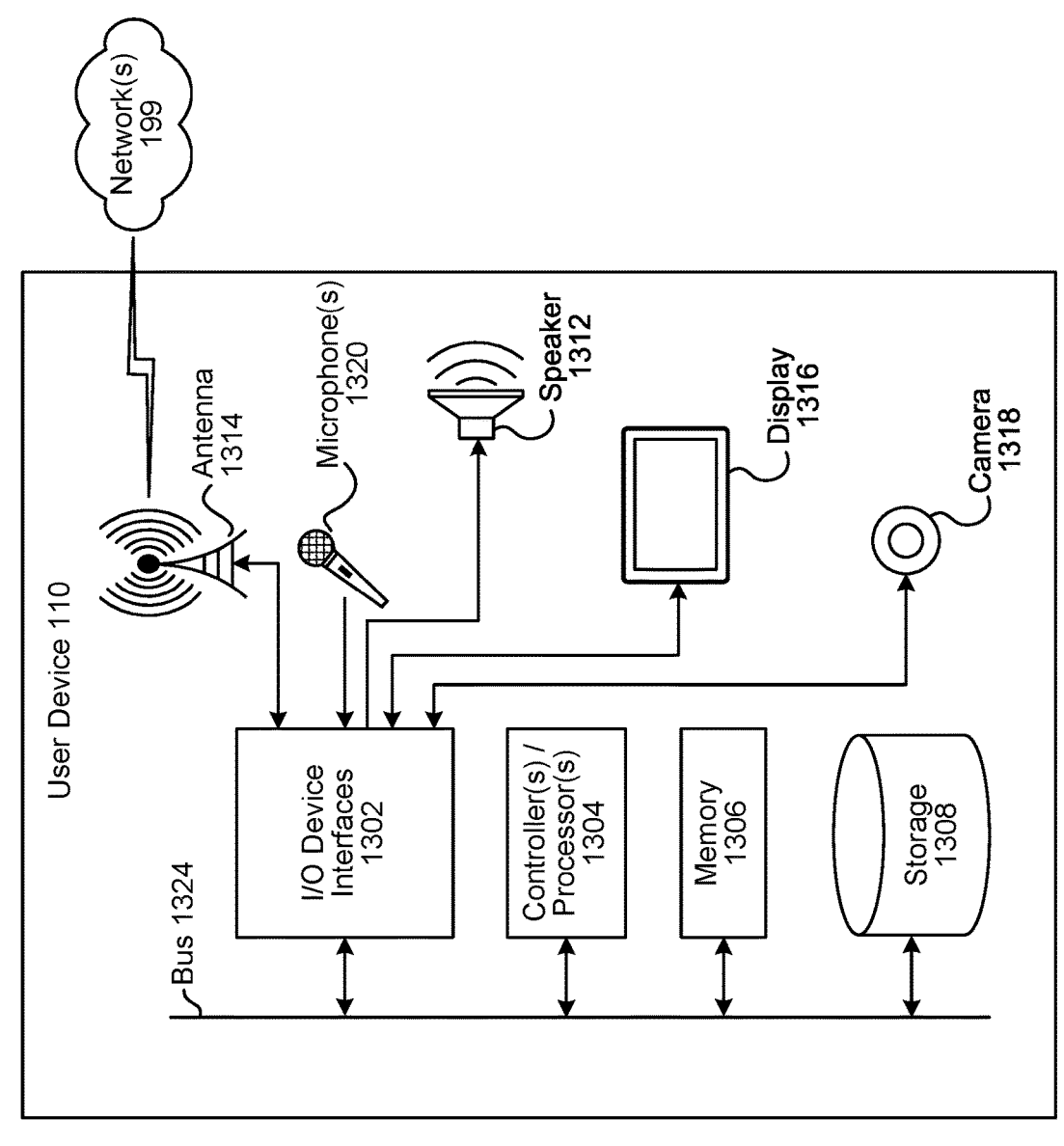
FIG. 13 is a block diagram conceptually illustrating example components of a device according to embodiments of the present disclosure.

FIG. 13 is a block diagram conceptually illustrating a device 110 that may be used with the system. FIG. 14 is a block diagram conceptually illustrating example components of a remote device, such as the system component(s) 120, which may assist with ASR processing, NLU processing, etc., and the skill support system(s) 1125. A system (120/1125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/1125) may be included in the overall system of the present disclosure, such as one or more system components 120 for performing ASR processing, one or more system components 120 for performing NLU processing, one or more skill systems 1125 for performing actions responsive to user inputs, etc. In operation, each of these systems may include computer-readable and computer-executable instructions that reside on the respective device (120/1125), as will be discussed further below.

Each of these devices (110/120/1125) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/1125) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/1125) may also be connected to removable or external non-volatile memory and/or storage (such as a removable memory card, memory key drive, networked storage, etc.) through respective input/output device interfaces (1302/1402).

Computer instructions for operating each device (110/120/1125) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/1125) includes input/output device interfaces (1302/1402). A variety of components may be connected through the input/output device interfaces (1302/1402), as will be discussed further below. Additionally, each device (110/120/1125) may include an address/data bus (1324/1424) for conveying data among components of the respective device. Each component within a device (110/120/1125) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the system component(s) 120, or the skill support system(s) 1125 may include their own dedicated processors, memory, and/or storage. Alternatively, one or more of the components of the device(s) 110, the system component(s) 120, or the skill support system(s) 1125 may utilize the I/O interfaces (1302/1402), processor(s) (1304/1404), memory (1306/1406), and/or storage (1308/1408) of the device(s) 110, system component(s) 120, or the skill support system(s) 1125, respectively. Thus, the ASR component 1150 may have its own I/O interface(s), processor(s), memory, and/or storage; the NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 1125, as described herein, are illustrative, and may be located as a stand-alone device or may be included, in whole or in part, as a component of a larger device or system.

As illustrated in FIG. 15, multiple devices (110a-110j, 120, 1125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 1125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1150, the NLU component, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving first audio data representing a first user input of a dialog session associated with a session identifier;
determining, using the first audio data, a first transcript representing the first user input, the first transcript associated with the session identifier;
determining first context data corresponding to the first user input;
generating a first prompt including at least the first transcript and the first context data, the first prompt being a first input for a large language model (LLM) to determine a response to the first user input;
selecting, from a group of LLMs, a first LLM to process the first prompt, the first LLM associated with a container identifier for a container that includes the first LLM and corresponding components to enable processing by the first LLM;
determining, using the first LLM, first encoded representations corresponding to the first prompt;
storing, at a cache associated with the first LLM, the first encoded representations;
based on storing the first encoded representations at the cache, storing first data representing an association between the session identifier and the container identifier;
determining, using the first LLM and the first encoded representations, a first response to the first user input;
causing presentation of the first response;
receiving second audio data representing a second user input of the dialog session, the second audio data associated with the session identifier;
determining, using the second audio data, a second transcript representing the second user input, the second transcript associated with the session identifier;
generating a second prompt including at least the first context data, the first transcript, the first response and the second transcript, the second prompt being a second input for a LLM to determine a response to the second user input;
based on the first data and based on the second user input being associated with the session identifier, selecting, from the group of LLMs, the first LLM to process the second prompt;
determining, from the cache associated with the first LLM, the first encoded representations corresponding to a first portion of the second prompt;
determining, using the first LLM, second encoded representations corresponding to a second portion of the second prompt;
storing, at the cache, the second encoded representations;
determining, using the first LLM, the first encoded representations and the second encoded representations, a second response to the second user input; and
causing presentation of the second response.

2. The computer-implemented method of claim 1, wherein determining the second encoded representations corresponding to the second prompt further comprises:
determining, using the stored first encoded representations, that a first portion of the second prompt corresponds to a second portion of the first encoded representations, the first portion of the second prompt including the first context data and the first transcript;
determining a third portion of the second prompt including the first response and the second transcript;

determining, using the first LLM, third encoded representations corresponding to the third portion of the second prompt; and determining the second encoded representations to include the second portion of the first encoded representations and the third encoded representations.

3. The computer-implemented method of claim 1, further comprising:

performing automatic speech recognition (ASR) processing using the first audio data to determine the first transcript;

generating a first portion of the first prompt including the first context data;

while performing ASR processing, determining, using the first LLM, a second portion of the first encoded representations corresponding to the first portion of the first prompt;

after determining the first transcript, determining a third portion of the first prompt including the first transcript; and determining, using the first LLM, a fourth portion of the first encoded representations corresponding to the third portion of the first prompt.

4. The computer-implemented method of claim 1, further comprising:

performing, using the first LLM and the first encoded representations, a first iteration of processing to determine a response to the first user input, the first iteration of processing resulting in generation of first processing data;

determining third encoded representations corresponding to the first processing data;

storing, at the cache, the third encoded representations;

performing, using the first LLM, the first encoded representations and the third encoded representations, a second iteration of processing to determine the first response corresponding to the first user input;

based on the first LLM determining the first response, discarding, from the cache, the third encoded representations;

determining fourth encoded representations corresponding to the first response;

storing, at the cache, the fourth encoded representations; and determining the second encoded representations corresponding to the second prompt by:

determining, from the cache, the first encoded representations and the fourth encoded representations; and generating, using the first LLM, fifth encoded representations corresponding to the second transcript.

5. A computer-implemented method comprising:

receiving first input data corresponding to a first user input associated with a first session identifier;

generating a first prompt including at least the first input data;

determining, using a first LLM from a group of LLMs, first encoded data corresponding to the first prompt, the first LLM associated with a container identifier for a container that includes the first LLM and corresponding components to enable processing by the first LLM;

storing, at a first cache associated with the first LLM, the first encoded data;

based on storing the first encoded data at the first cache, storing first data representing an association between the first session identifier and the container identifier;

receiving second input data corresponding to a second user input associated with the first session identifier;

generating a second prompt including at least the first input data and the second input data;

based on the first data and based on the second input data being associated with the first session identifier, selecting, from the group of LLMs, the first LLM to process the second prompt;

determining, using the first LLM and the first cache, second encoded data corresponding to the second prompt;

storing, at the first cache, at least a portion of the second encoded data; and using the first LLM and at least the second encoded data, determining first output data responsive to the second user input.

6. The computer-implemented method of claim 5, wherein determining the second encoded data corresponding to the second prompt further comprises:

determining, using the stored first encoded data, that a first portion of the second prompt corresponds to a second portion of the first encoded data;

determining, using the first LLM, third encoded data corresponding to a third portion of the second prompt different than the first portion of the second prompt; and determining the second encoded data to include the second portion of the first encoded data and the third encoded data.

7. The computer-implemented method of claim 5, further comprising:

receiving audio data representing the first user input;

in response to receiving the audio data, determining context data corresponding to the first user input;

determining a first portion of the first prompt including at least the context data;

performing automatic speech recognition (ASR) processing using the audio data to determine the first input data representing a transcript of the first user input; and while performing ASR processing, determining, using the first LLM, third encoded data corresponding to the first portion of the first prompt.

8. The computer-implemented method of claim 5, further comprising:

performing, using the first LLM and the first encoded data, a first iteration of processing to determine a response to the first user input, the first iteration of processing resulting in generation of first processing data;

determining third encoded data corresponding to the first processing data;

storing, at the first cache, the third encoded data; and performing, using the first LLM, the first encoded data and the third encoded data, a second iteration of processing to determine second output data responsive to the first user input.

9. The computer-implemented method of claim 8, further comprising:

based on the first LLM determining the second output data responsive to the first user input, discarding, from the first cache, the third encoded data;

storing, in the first cache, fourth encoded data corresponding to the second output data;

determining the second prompt to include the first input data, the second output data and the second input data; and

determining the second encoded data corresponding to the
second prompt by:
   determining, from the first cache, the first encoded data
and the fourth encoded data; and
   generating, using the first LLM, fifth encoded data
corresponding to the second input data.

10. The computer-implemented method of claim 5, further comprising:
   determining that a response to the first user input is
generated;
   before determining the second prompt and based on the
response to the first user input being generated, discarding, from the first cache, a first portion of the first
encoded data; and
   determining the second encoded data based on a second
portion of the first encoded data that is stored at the first
cache.

11. The computer-implemented method of claim 5, further comprising:
   receiving third input data representing a third user input
associated with a second session identifier;
   generating a third prompt including at least the third input
data, the third prompt being a third input for a LLM to
determine a response to the third user input;
   determining, using session data, that the second session
identifier is unassociated with a container identifier for
a LLM;
   based on determining that the second session identifier is
unassociated with a container identifier for a LLM,
selecting, from the group of LLMs, a second LLM to
process the third prompt;
   determining, using the second LLM, third encoded data
corresponding to the third prompt; and
   storing, at a second cache associated with the second
LLM, the third encoded data.

12. The computer-implemented method of claim 5, further comprising:
   receiving third input data representing a third user input;
   determining a third prompt including at least the third
input data;
   determining that the third input data is similar to fourth
input data representing a past user input;
   determining that the fourth input data was previously
processed using a second LLM of the group of LLMs;
and
   based on the third input data being similar to the fourth
input data and the fourth input data being previously
processed using the second LLM, selecting the second
LLM to process the third prompt.

13. A system comprising:
   at least one processor; and
   at least one memory including instructions that, when
executed by the at least one processor, cause the system
to:
    receive first input data corresponding to a first user
input of a first dialog session, the first input data
associated with a first session identifier for the first
dialog session;
    generate a first prompt including at least the first input
data, the first prompt being a first input for a large
language model (LLM) to determine a response to
the first user input;
    determine, using a first LLM from a group of LLMs,
first encoded data corresponding to the first prompt,
the first LLM being associated with a first container
identifier;

64 store, at a first cache associated with the first LLM, the
first encoded data;
    based on storing the first encoded data at the first cache,
store first data representing a first association
between the first dialog session and the first container identifier;
    receive second input data corresponding to a second
user input of the first dialog session, the second input
data associated with the first session identifier;
    generate a second prompt including at least the first
input data and the second input data, the second
prompt being a second input for a LLM to determine
a response to the second user input;
    based on the first data indicating an association
between the first session identifier and the first
container identifier and based on the second input
data being associated with the first session identifier,
select from the group of LLMs, the first LLM to
process the second prompt;
    determine, using the first LLM and the first cache,
second encoded data corresponding to the second
prompt;
    store, at the first cache, at least a portion of the second
encoded data; and
    use the first LLM and at least the second encoded data,
determining first output data responsive to the second user input.

14. The system of claim 13, wherein the instructions that
cause the system to determine the second encoded data
corresponding to the second prompt, further causes the
system to:
   determine, using the stored first encoded data, that a first
portion of the second prompt corresponds to a second
portion of the first encoded data;
   determine, using the first LLM, third encoded data corresponding to a third portion of the second prompt
different than the first portion of the second prompt; and
   determine the second encoded data to include the second
portion of the first encoded data and the third encoded
data.

15. The system of claim 13, wherein the at least one
memory includes further instructions that, when executed by
the at least one processor, further cause the system to:
   receive audio data representing the first user input;
   in response to receiving the audio data, determine context
data corresponding to the first user input;
   determine a first portion of the first prompt including at
least the context data;
   perform automatic speech recognition (ASR) processing
using the audio data to determine the first input data
representing a transcript of the first user input; and
   while performing ASR processing, determine, using the
first LLM, third encoded data corresponding to the first
portion of the first prompt.

16. The system of claim 13, wherein the at least one
memory includes further instructions that, when executed by
the at least one processor, further cause the system to:
   perform, using the first LLM and the first encoded data, a
first iteration of processing to determine a response to
the first user input, the first iteration of processing
resulting in generation of first processing data;

determine third encoded data corresponding to the first processing data;

store, at the first cache, the third encoded data; and perform, using the first LLM, the first encoded data and the third encoded data, a second iteration of processing to determine second output data responsive to the first user input.

17. The system of claim 16, wherein the at least one memory includes further instructions that, when executed by the at least one processor, further cause the system to:

based on the first LLM determining the second output data responsive to the first user input, discard, from the first cache, the third encoded data;

store, in the first cache, fourth encoded data corresponding to the second output data;

determine the second prompt to include the first input data, the second output data and the second input data; and determine the second encoded data corresponding to the second prompt by:

determining, from the first cache, the first encoded data and the fourth encoded data; and generating, using the first LLM, fifth encoded data corresponding to the second input data.

18. The system of claim 13, wherein the at least one memory includes further instructions that, when executed by the at least one processor, further cause the system to:

determine that a response to the first user input is generated;

before determining the second prompt and based on the response to the first user input being generated, discard, from the first cache, a first portion of the first encoded data; and determine the second encoded data based on a second portion of the first encoded data that is stored at the first cache.

19. The system of claim 13, wherein the at least one memory includes further instructions that, when executed by the at least one processor, further cause the system to:

receive third input data representing a third user input of a second dialog session, the third input data associated with a second session identifier for the second dialog session;

generate a third prompt including at least the third input data, the third prompt being a third input for a LLM to determine a response to the third user input;

determine, using session data, that the second dialog session is unassociated with a container identifier for a LLM;

based on determining that the second dialog session is unassociated with a container identifier for a LLM, select, from the group of LLMs, a second LLM to process the third prompt;

determine, using the second LLM, third encoded data corresponding to the third prompt; and store, at a second cache associated with the second LLM, the third encoded data.

20. The system of claim 13, wherein the at least one memory includes further instructions that, when executed by the at least one processor, further cause the system to:

receive third input data representing a third user input;

determine a third prompt including at least the third input data;

determine that the third input data is similar to fourth input data representing a past user input;

determine that the fourth input data was previously processed using a second LLM of the group of LLMs; and based on the third input data being similar to the fourth input data and the fourth input data being previously processed using the second LLM, select the second LLM to process the third prompt.

* * * * *